(12) United States Patent
Iaconis et al.

(10) Patent No.: US 10,193,169 B2
(45) Date of Patent: Jan. 29, 2019

(54) FLUIDIC INTERFACE MODULE FOR A FUEL CELL SYSTEM

(71) Applicant: Intelligent Energy Limited, Loughborough (GB)

(72) Inventors: Jean-Louis Iaconis, Burnaby (CA); Aaron MacDonald, Vancouver (CA); Benjamin Tam, New York, NY (US)

(73) Assignee: Intelligent Energy Limited, Loughborough (GB)

( * ) Notice: Subject to any disclaimer, the term of this patent is extended or adjusted under 35 U.S.C. 154(b) by 421 days.

(21) Appl. No.: 14/853,532

(22) Filed: Sep. 14, 2015

(65) Prior Publication Data

US 2016/0056485 A1    Feb. 25, 2016

Related U.S. Application Data

(63) Continuation of application No. PCT/IB2014/000817, filed on Mar. 14, 2014, which
(Continued)

(51) Int. Cl.
*F16K 7/14* (2006.01)
*F16K 31/02* (2006.01)
(Continued)

(52) U.S. Cl.
CPC ........... *H01M 8/04231* (2013.01); *F16K 7/14* (2013.01); *F16K 31/02* (2013.01);
(Continued)

(58) Field of Classification Search
CPC ...... H01M 8/04223–8/04231; H01M 8/04298; H01M 8/0438–8/04388;
(Continued)

(56) References Cited

U.S. PATENT DOCUMENTS 2,183,569 A    12/1939    Hughes
2,991,799 A    7/1961    Littlefield
(Continued)

FOREIGN PATENT DOCUMENTS

CN    1922750 A    2/2007
CN    101287650 A    10/2008
(Continued)

OTHER PUBLICATIONS

International Search Report and Written Opinion issued in connection with the corresponding Application No. PCT/IB2014/000817 dated Oct. 1, 2014.
(Continued)

*Primary Examiner* — Jonathan Crepeau
*Assistant Examiner* — Jacob Buchanan
(74) *Attorney, Agent, or Firm* — Baker & Hostetler LLP

(57) ABSTRACT

Purge valves (I 09, I 09', 200) that are manually turned ON but are automatically or electrically turned OFF as the fuel cell (108)'s production of electricity reaches a predetermined level, e.g., steady state or thereabout are disclosed. The purge valve may be opened at system start-up, or may be opened at system shut-down so that the purge valve is anned and the fuel cell system is purged at the next start-up. Also disclosed is an integrated fluidic interface module (10) that contains various fluidic components including one of these purge valves. The integrated fluidic interface module (10) can operate passively or without being actively controlled by a processor. Methods of operating a fuel cell system, wherein the fuel cell system is purged at system start-up, are also disclosed. The purging automatically stops when the anode plenum is fully purged and replaced with fuel.

8 Claims, 19 Drawing Sheets

Related U.S. Application Data is a continuation-in-part of application No. 13/836,789, filed on Mar. 15, 2013, now Pat. No. 9,577,273.

(51) Int. Cl.
| | |
|---|---|
| *H01M 8/04* | (2016.01) |
| *H01M 8/04223* | (2016.01) |
| *H01M 8/04082* | (2016.01) |
| *H01M 8/04228* | (2016.01) |
| *H01M 8/04225* | (2016.01) |

(52) U.S. Cl.
CPC ... *H01M 8/04201* (2013.01); *H01M 8/04208* (2013.01); *H01M 8/04228* (2016.02); *H01M 8/04225* (2016.02); *H01M 2250/30* (2013.01); *Y02B 90/18* (2013.01); *Y02P 70/56* (2015.11)

(58) Field of Classification Search
CPC ....... F16K 1/00–1/54; F16K 3/00–3/36; F16K 7/00–7/20; F16K 31/00–31/055
See application file for complete search history.

(56) References Cited

U.S. PATENT DOCUMENTS

| | | | |
|---|---|---|---|
| 3,071,936 A | | 1/1963 | Irwin |
| 3,590,860 A | | 7/1971 | Stenner |
| 3,613,732 A | * | 10/1971 | Willson ............... F03G 7/065 137/625.44 |
| 3,911,947 A | | 10/1975 | Boxall |
| 3,971,398 A | | 7/1976 | Taylor et al. |
| 4,205,644 A | | 6/1980 | Treadwell et al. |
| 4,220,313 A | * | 9/1980 | Petersen et al. ............. 251/280 |
| 4,469,124 A | | 9/1984 | Bronsky et al. |
| 4,537,387 A | * | 8/1985 | Danby ............. A61M 5/16881 137/510 |
| 4,543,935 A | | 10/1985 | Tuckey |
| 4,973,024 A | | 11/1990 | Homma |
| 5,755,425 A | | 5/1998 | Marolda |
| 5,964,089 A | | 10/1999 | Murphy et al. |
| 5,989,741 A | | 11/1999 | Bloomfield et al. |
| 6,127,058 A | | 10/2000 | Pratt et al. |
| 6,247,678 B1 | | 6/2001 | Hines et al. |
| 6,273,117 B1 | | 8/2001 | McPhee |
| 6,363,964 B1 | | 4/2002 | Carroll |
| 6,499,509 B2 | * | 12/2002 | Berger et al. ............. 137/625.65 |
| 6,544,400 B2 | | 4/2003 | Hockaday et al. |
| 6,718,998 B2 | | 4/2004 | Gagnon |
| 6,924,054 B2 | | 8/2005 | Prasad et al. |
| 6,948,520 B2 | | 9/2005 | Carroll |
| 7,007,714 B2 | | 3/2006 | Carroll |
| 7,051,755 B2 | | 5/2006 | Zuck |
| 7,059,582 B2 | | 6/2006 | Adams et al. |
| 7,172,825 B2 | | 2/2007 | Adams et al. |
| 7,378,176 B2 | | 5/2008 | McLean et al. |
| 7,474,075 B2 | | 1/2009 | McLean et al. |
| 7,481,858 B2 | | 1/2009 | Rosenzweig et al. |
| 7,537,024 B2 | | 5/2009 | Adams et al. |
| 7,578,310 B2 | | 8/2009 | Teliscszuk et al. |
| 7,632,587 B2 | | 12/2009 | McLean et al. |
| 7,670,706 B2 | | 3/2010 | Yamamoto et al. |
| 7,674,540 B2 | | 3/2010 | Adams et al. |
| 7,727,293 B2 | | 6/2010 | Rosenzweig et al. |
| 7,745,034 B2 | | 6/2010 | An et al. |
| 7,762,278 B2 | | 7/2010 | Adams et al. |
| 7,776,487 B2 | | 8/2010 | Tanaka et al. |
| 7,896,934 B2 | | 3/2011 | Curello et al. |
| 7,968,250 B2 | | 6/2011 | Kaschmitter et al. |
| 8,002,853 B2 | | 8/2011 | Curello et al. |
| 8,082,948 B2 | | 12/2011 | Curello et al. |
| D673,497 S | | 1/2013 | Rosenzweig et al. |
| 8,794,266 B1 | | 8/2014 | Friedman et al. |
| 2002/0182475 A1 | | 12/2002 | Pan |
| 2003/0022041 A1 | | 1/2003 | Barton et al. |
| 2003/0134165 A1 | | 7/2003 | Reiser et al. |
| 2004/0224190 A1 | | 11/2004 | Sasahara et al. |
| 2004/0224200 A1 | | 11/2004 | Ichikawa et al. |
| 2005/0263189 A1 | | 12/2005 | Nakamura |
| 2005/0266281 A1 | | 12/2005 | Adams et al. |
| 2006/0071088 A1 | | 4/2006 | Adams et al. |
| 2006/0127734 A1 | | 6/2006 | McLean et al. |
| 2006/0251935 A1 | | 11/2006 | Barrett et al. |
| 2007/0166582 A1 | | 7/2007 | Okamoto |
| 2007/0184330 A1 | | 8/2007 | McLean et al. |
| 2007/0196701 A1 | | 8/2007 | Roberts et al. |
| 2008/0145739 A1 | | 6/2008 | Adams et al. |
| 2008/0202921 A1 | | 8/2008 | Wilkinson et al. |
| 2008/0233443 A1 | | 9/2008 | Jacobsen et al. |
| 2008/0233446 A1 | | 9/2008 | Zimmermann et al. |
| 2008/0233454 A1 | | 9/2008 | Capron et al. |
| 2009/0081493 A1 | | 3/2009 | Schrooten et al. |
| 2009/0123342 A1 | | 5/2009 | Sgroi et al. |
| 2009/0123803 A1 | | 5/2009 | Faucheux et al. |
| 2009/0130527 A1 | | 5/2009 | McLean et al. |
| 2009/0162722 A1 | | 6/2009 | Schrooten et al. |
| 2009/0169945 A1 | | 7/2009 | Laurent et al. |
| 2009/0311561 A1 | | 12/2009 | Rosenzweig et al. |
| 2010/0104481 A1 | | 4/2010 | Curello et al. |
| 2010/0167132 A1 | | 7/2010 | McLean et al. |
| 2011/0036433 A1 | | 2/2011 | Spahr |
| 2011/0099904 A1 | | 5/2011 | Rosenzweig et al. |
| 2011/0104021 A1 | | 5/2011 | Curello et al. |
| 2011/0121220 A1 | | 5/2011 | Curello et al. |
| 2011/0189574 A1 | | 8/2011 | Curello et al. |
| 2011/0212374 A1 | | 9/2011 | Rosenzweig et al. |
| 2011/0240159 A1 | | 10/2011 | Curello et al. |
| 2011/0243836 A1 | | 10/2011 | Curello et al. |
| 2012/0138172 A1 | | 6/2012 | Curello et al. |
| 2013/0059225 A1 | | 3/2013 | Fauchex et al. |

FOREIGN PATENT DOCUMENTS

| | | |
|---|---|---|
| WO | WO 2005/078845 A2 | 8/2005 |
| WO | WO 2007/020242 A1 | 2/2007 |
| WO | WO 2009/105896 A1 | 9/2009 |
| WO | WO 2011/079377 A1 | 7/2011 |
| WO | WO 2011/079378 A1 | 7/2011 |
| WO | WO 2011/127608 A1 | 10/2011 |
| WO | WO 2013/000561 A1 | 1/2013 |
| WO | WO 2013/093646 A1 | 6/2013 |

OTHER PUBLICATIONS

International Search Report and Written Opinion issued in connection with the PCT/US2008/052809 dated Sep. 2, 2008.
European Patent Application No. 14765133.5; Extended Search Report; dated Sep. 15, 2016; 7 pages.

\* cited by examiner

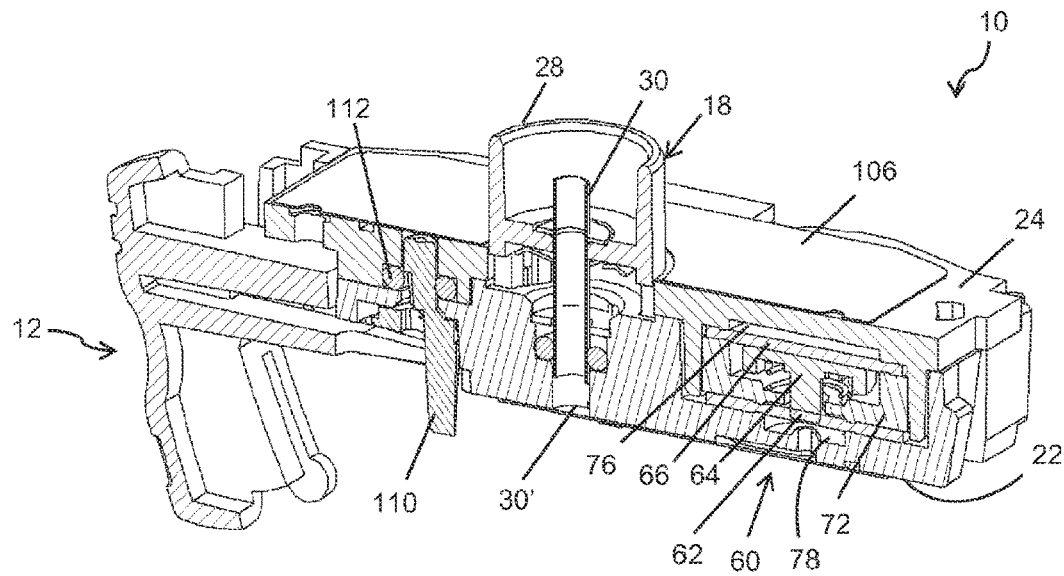
Figure 1C
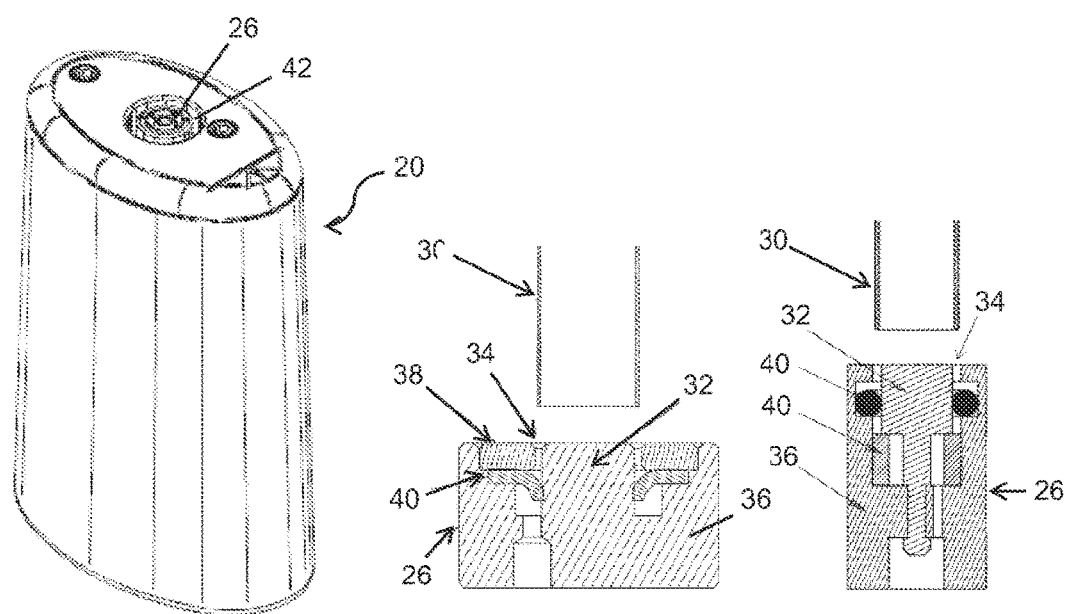
Figure 2A
Figure 2B
Figure 2C

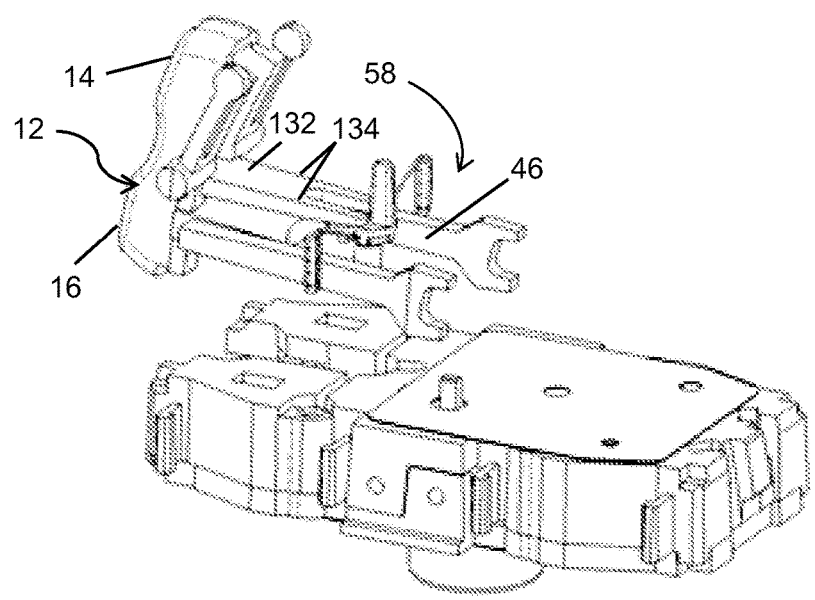
Figure 8B
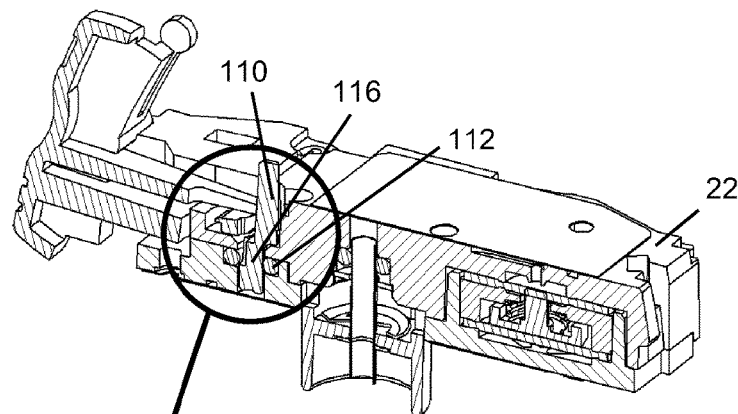
Figure 8C
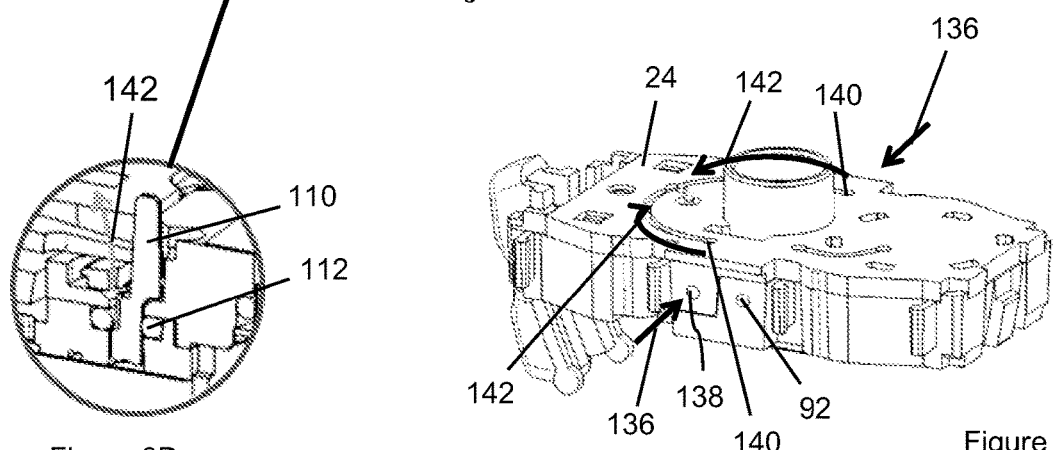
Figure 8D
Figure 8E

FLUIDIC INTERFACE MODULE FOR A FUEL CELL SYSTEM

CROSS-REFERENCE TO RELATED APPLICATIONS

This application is a Continuation of International Patent Application No. PCT/IB2014/000817 filed Mar. 14, 2014 which is a Continuation-in-Part of and claims priority to U.S. patent application Ser. No. 13/836,789 filed Mar. 15, 2013, the contents of which are incorporated herein by reference in their entirety.

FIELD OF THE INVENTION

This invention generally relates to a fluidic interface module for a fuel cell system and more specifically to an integrated fluidic interface module within a mobile fuel cell power source and adapted to connect to a hydrogen source.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuels, as well as portable power storage, such as lithium-ion batteries. In particular, one use of fuel cells is to be a mobile power source for portable or mobile consumer electronic devices, such as cell phones, smart phone personal digital assistants, personal gaming devices, global positioning devices, rechargeable batteries, etc.

Known fuel cells include alkali fuel cells, polymer electrolyte fuel cells, phosphoric acid fuel cells, molten carbonate fuel cells, solid oxide fuel cells and enzyme fuel cells. Fuel cells generally run on hydrogen (H2) fuel, and they can also consume non pure hydrogen fuel. Non pure hydrogen fuel cells include direct oxidation fuel cells, such as direct methanol fuel cells (DMFC), which use methanol, or solid oxide fuel cells (SOFC), which use hydrocarbon at high temperature. Hydrogen fuel can be stored in compressed form or within compounds such as alcohols or hydrocarbons or other hydrogen containing materials that can be reformed or converted into hydrogen fuel and byproducts. Hydrogen can also be stored in chemical hydrides, such as sodium borohydride (NaBH4), that react with water or an alcohol to produce hydrogen and byproducts. Hydrogen can also be adsorbed or absorbed in metal hydrides, such as lanthanum pentanickel (LaNi5) at a first pressure and temperature and released to a fuel cell at a second pressure and temperature. Hydrogen can also be released via thermolysis reaction of a metal hydride such as magnesium hydride ($MgH_2$).

Most low temperature hydrogen fuel cells have a proton exchange membrane or polymer electrolyte membrane (PEM), which allows the hydrogen's protons to pass through but forces the electrons to pass through an external circuit, which advantageously can be a smart phone, a personal digital assistant (PDA), a computer, a power tool or any device that uses electron flow or electrical current. The fuel cell reaction can be represented as follows:

Half-reaction at the anode of the fuel cell:

Half-reaction at the cathode of the fuel cell:

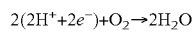

Generally, the PEM is made from a proton exchange polymer which acts as the electrolyte, such as Nation® available from DuPont, which is a perfluorinated sulfonic acid polymer or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

The patent and scientific literatures disclose few complete and commercialize-able fuel cell systems that include the generation of hydrogen fuel, the control of the fluidics, the balance of plant and the electrical power generation. The literatures do not discuss fluidic interface systems for fuel cells systems, particularly mobile fuel cell systems. Hence, there remains a need for such fuel cell systems.

SUMMARY OF THE INVENTION

The invention is directed to an integrated fluidic interface system or module for a fuel cell system that mates with a fuel source, such as hydrogen, regulates the incoming fuel pressure to a lower pressure that is usable with the fuel cell and purges the fuel plenum in the fuel cell when a user turns the fuel cell system ON or OFF. No other action is required from the user. In one embodiment, the integrated fluidic interface system has a single switch or ON/OFF button to activate all the fluidic components on the module.

The invention is further directed to a passive integrated interface system or module for a fuel cell system that performs the function discussed in the preceding paragraph without being actively controlled by a controller or microprocessor, without being powered by a power source other than an ON/OFF activation by the user, the pressure of the incoming fuel such as hydrogen and the electricity generated by the fuel cell. Such power source includes, but is not limited to, internal or external batteries, or power from the device that the fuel cell system powers.

The present invention is also related to methods of operating a fuel cell system, wherein the fuel cell system is purged or vented at system start-up. The purging automatically stops when the anode plenum is fully purged and its content is replaced with fuel. The present invention is also related to an inventive purge valve that is manually turned ON but is automatically turned OFF as the fuel cell's production of electricity reaches a predetermined level, e.g., steady state or thereabout. The purge valve may be opened at system start-up, or may be opened at system shut-down so that the purge valve is armed and the fuel cell system is purged at the next start-up. In one embodiment, the inventive purge valve is mechanically actuated or armed to open and electrically actuated to close.

The present invention relates to a valve, which can function as a purge valve, comprising a movable shuttle with a body portion having a substantially constant diameter coupled to a shape memory alloy (SMA) actuator. The body portion has a sealing portion and an open portion, wherein in a closed configuration the sealing portion is positioned adjacent to a sealing member to form a seal and in an open configuration the open portion is positioned adjacent to the sealing member to create a flow path through the valve. The SMA actuator electrically contacts a fuel cell when the shuttle is moved from the closed configuration to the open configuration, and the electrical power from the fuel cell contracts the SMA actuator to move the shuttle to the closed configuration and to disengage the SMA actuator from the fuel cell. The body portion defines a cut-out located in the open portion and the flow path includes a flow through the cut-out.

The present invention further relates another valve that can function as a purge valve comprising an inlet, an outlet, a diaphragm, a biasing member that urges the diaphragm toward the inlet or outlet to a sealing position to close the valve, and a slider that moves the biasing member to an open position to allow the diaphragm to move away from the inlet or outlet to open the valve. The valve also has a shape memory alloy (SM A) actuator connected to the biasing member and is actuated by an electrical current to move the biasing member to the open position. The valve further comprises a latching mechanism to hold the slider in a position that keeps the biasing member in the open position. Preferably, the diaphragm is located to isolate the SMA actuator from a fluid that passes through the valve to minimize the heat transfer between the SM A wire and the fluid.

The present invention further relates to a fuel cell system comprising one of the purge valves described herein, and a switch to turn the fuel cell system ON or OFF, wherein the switch pushes the valve to the open configuration. The switch of ON/OFF pushbutton may push a slider in one valve adapted to push a biased member away from a closed configuration to an open configuration. The switch comprises a pusher adapted to push a shoulder on the shuttle on another valve to the open configuration. The switch may push the shuttle to the open configuration when the fuel cell system turns ON or when the fuel cell system turns OFF.

The present invention further relates to a fuel cell system comprising one of the purge valves described-herein and an interface port that extends to open a shut-off valve on a fuel cartridge and retracts to close the shut-off valve, wherein the interface port pushes the shuttle to the open configuration. The interface port pushes the shuttle of one purge valve to the open configuration when the interface port extends or when the interface port retracts. The interface port comprises a pusher adapted to push a shoulder on the shuttle to the open configuration. The interface port may also push the slider of another purge valve to move the valve to the open configuration.

The present invention is further related to an integrated fluidic interface module connecting a fuel cartridge to a fuel cell system comprising at least one fuel cell. The module comprises a retractable interface port movable between an extended position where the interface port opens a shut-off valve on the fuel cartridge and a refracted position where the shut-off valve is closed, a purge valve to purge an anode compartment of the at least one fuel cell, and a switch. The switch is activated to move the interface port between the extended position and the retracted position and to move the purge valve to an open configuration. The purge valve may move to the open configuration at a start-up of the fuel cell system or a shut-down of the fuel cell system.

The present invention also relates to a passive integrated fluidic interface module connecting a fuel cartridge to a fuel cell system comprising at least one fuel cell. The module comprises a retractable interface port movable between an extended position where the interface port opens a shut-off valve on the fuel cartridge and a retracted position where the shut-off valve is closed, a purge valve to purge an anode compartment of the at least one fuel cell, and a switch. The purge valve is opened manually by activating the switch and the fuel cell closes the purge valve by a power from the at least one fuel cell and without being actively controlled by a processor or powered by another source.

BRIEF DESCRIPTION OF THE DRAWINGS

In the accompanying drawings, which form a part of the specification and are to be read in conjunction therewith and in which like reference numerals are used to indicate like parts in the various views and various embodiments:

FIG. 1C is a cross-sectional view of FIG. 1B;

FIG. 2A is a top perspective view of an exemplary fuel cartridge; FIGS. 2B-2C are cross-sectional views of exemplary cartridge shut-off valves.

FIG. 8B is a further partial exploded view of FIG. 8A; FIG. 8C is the same as FIG. 1C but viewed from reference surface 22 and FIG. 8D is an enlarged view of the purge shuttle of FIG. 8C; FIG. 8E is a perspective view from reference surface 24 of the inventive integrated fluidic interface module showing the purge flow manifold;

Figure 1A:
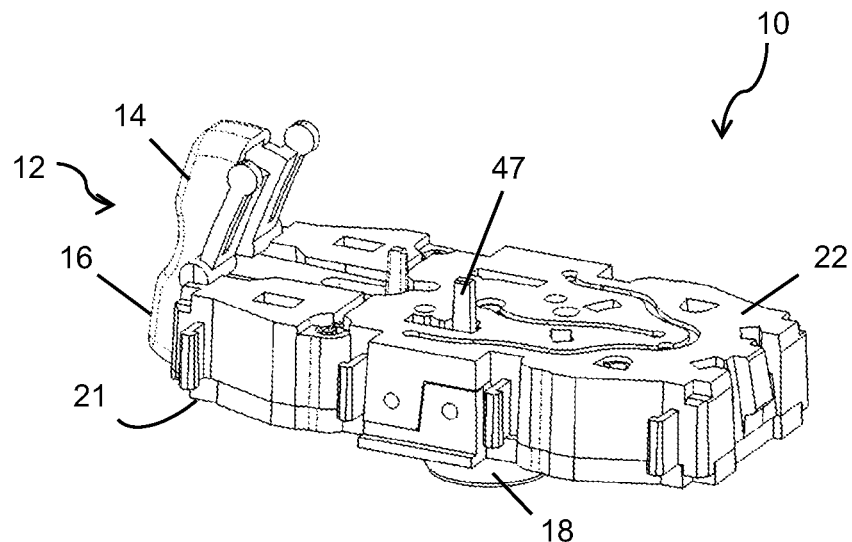
FIG. 1A is a perspective view from a reference surface 22 of an inventive integrated fluidic interface module 10 and FIG. 1B is a perspective view from reference surface 24 opposite to reference surface 22 of an inventive integrated fluidic interface module.
Figure 1B:
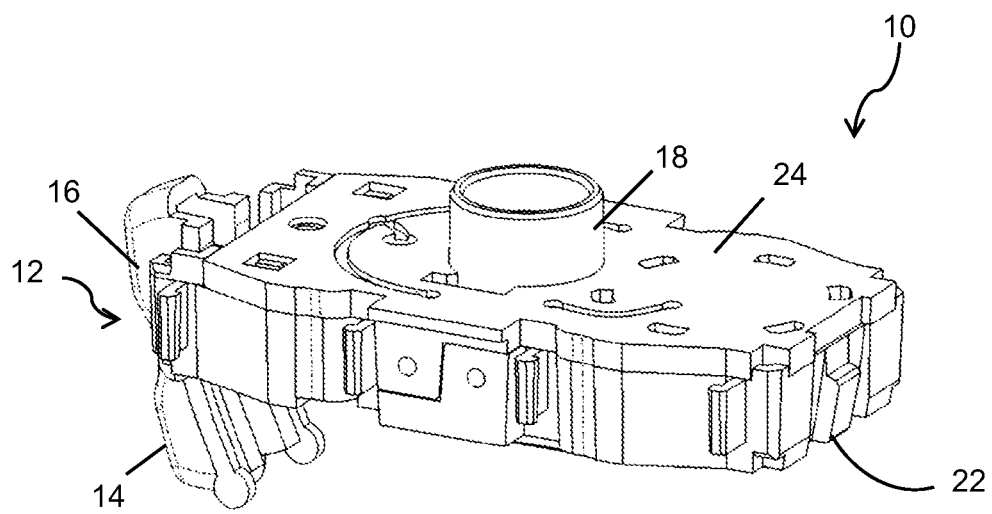

A parts list correlating the reference numbers used in the drawings to the part names used in the specification is provided at the end of the specification.

DETAILED DESCRIPTION OF THE PREFERRED EMBODIMENTS

Integrated fluidic interface modules of the present invention are fluidic modules that connect a fuel cartridge, such as a methanol or butane fuel cartridge, hydrogen storage device or hydrogen generator, to a fuel cell, such as PEM fuel cells, DMFC, SOFC or other fuel cells. Integrated fluidic interface modules of the present invention provide a docking port or connection to the fuel cartridge to allow the fuel to flow from the cartridge to the integrated fluidic interface module. The integrated fluidic interface modules also regulate the pressure of the incoming fuel to a lower pressure that fuel cells prefer. The inventive integrated fluidic interface modules also purge the fuel cells to remove unwanted gases in the anodes of the fuel cells semi-automatically or manually.

Referring to FIGS. 1A-IC, integrated fluidic interface module 10 (hereinafter module 10) is shown from the top side and the bottom side, respectively. Module 10 has switch 12 with an "ON" segment 14 and an "OFF" segment 16. Module 10 also have a module interface port 18 sized and dimensioned to connect to a fuel cartridge 20 shown in FIG. 2A. Top side 22 and bottom side 24 of module 10 contain a plurality of micro-fluidic channels that are described in details below. It is noted that the terms "top" and "bottom" are relative terms and are used for the ease of describing the present invention. Surfaces 22 and 24 are reference surfaces designated to aid in the description of the present invention. These terms do not necessarily indicate the orientation of module 10 or the fuel cell system as a whole during actual operation. Fuel cartridge 20, module 10 and the fuel cell system incorporating module 10 can operate in any orientation.

FIGS. 2A-2C show an exemplary fuel cartridge 20 and exemplary cartridge shut-off valves 26 that can be used with module 10. Fuel cartridge 20 is described in published patent applications US 2011/0212374, US 2011/0099904, and US 2011/0104021 and U.S. D673,497 and valves 26 are described in published patent applications US 2011/0121220, US 2011/0189574, US 2011/0212374 and US 2011/0099904. These references are incorporated herein by reference in their entireties. Module interface port 18 comprises outer guard 28 and inner tube 30. Tube 30 is sized and dimensioned to open cartridge shut-off valve 26, shown in FIGS. 2B-2C. Shut-off valve 26 may have a center post 32, which forms a gap 34 with valve body 36 and/or seal retainer 38. Tube 30 of module interface port 18 enters gap 34 to open one or more seal 40. When tube 30 is withdrawn from cartridge valve 26, seal(s) 40 re-closes fuel cartridge. 20. Other suitable shut-off valves 26 usable with module 10 include, but are not limited to U.S. Pat. Nos. 7,537,024, 7,762,278, 7,059,582 and 6,924,054 and published patent application US 2008/0145739.

Outer guard 28 of module interface port 18 is sized and dimensioned to match a corresponding channel 42 on cartridge 20. One advantage of having guard 28 and matching channel 42 is to ensure that a proper fuel cartridge is being used with module 10 or fuel cell system 21. Guard 28 and channel 42 may have other shapes, such as oval, star, polygonal or any regular or irregular shapes.

Figure 2D:
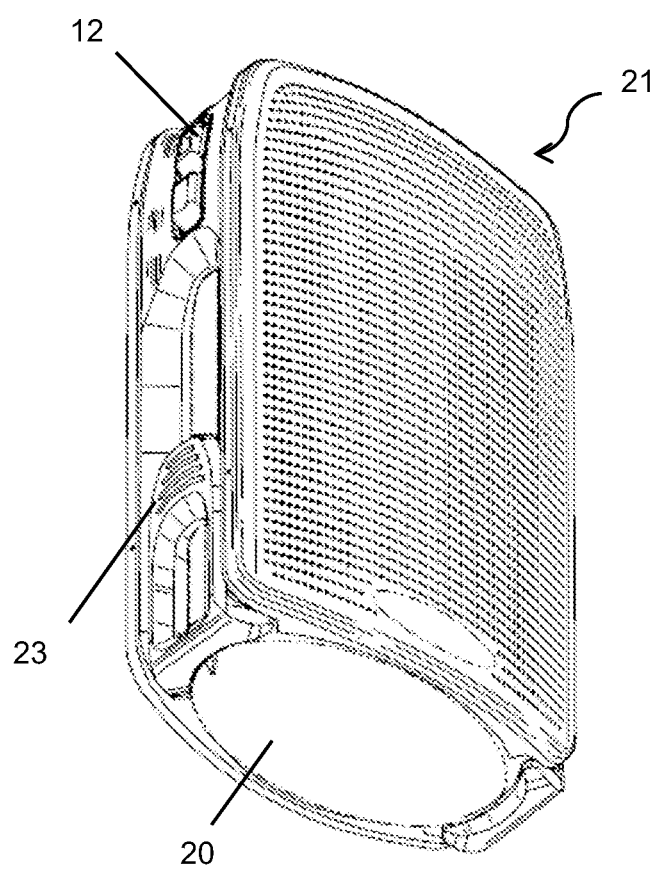
FIG. 2D is a bottom perspective view of an exemplary fuel cell system.

FIG. 2D illustrates an exemplary fuel cell system 21 that may incorporate the inventive module 10. Switch 12 is also illustrated in FIG. 2D. Fuel cartridge 20 may be inserted into an opening in fuel cell system 21. Fuel cell system 21 may be a fuel cell charger with a USB charging port or DC port (shown below in FIG. 10C) on its surface. Fuel cell system 21 may also be a consumer electronic device, a flashlight, a radio, a music player such as a MP3 player, a computer tablet or a laptop. Fuel cell system may have clamp 23 to securely hold cartridge 20 therewithin after insertion. Clamp 23 may also be actuated or pushed to release cartridge 20. In other embodiments, the fuel cell system may have other means of coupling cartridge 20 to the fuel cell system; for example, clips, geometric features such as recesses or bosses, friction fit, or other coupling mechanisms. The present invention is not limited to any particular application or usage of the fuel cell system.

Figure 3A:
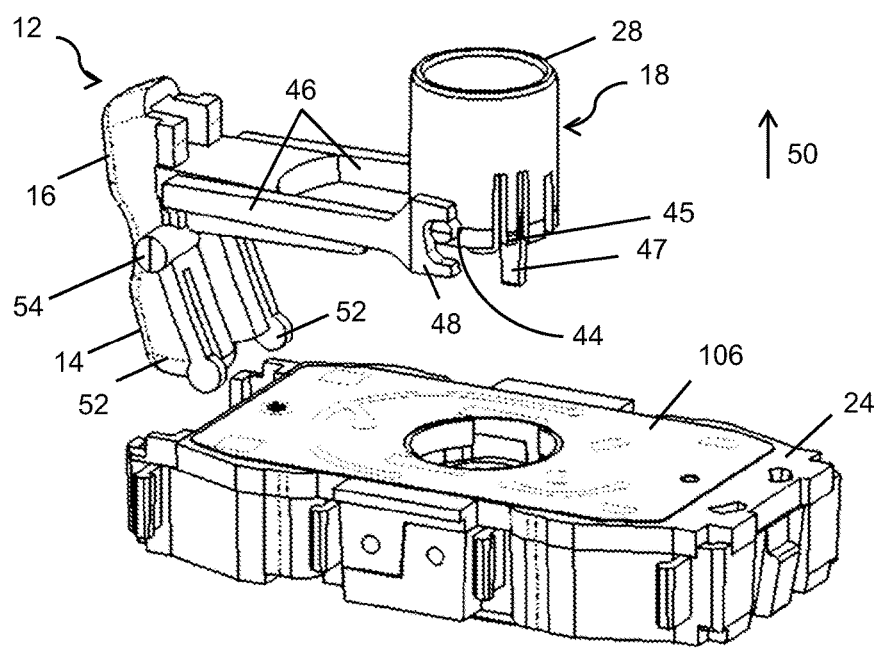
FIG. 3A is a partial exploded view of FIG. 1B.
Figures 3B, 3C:
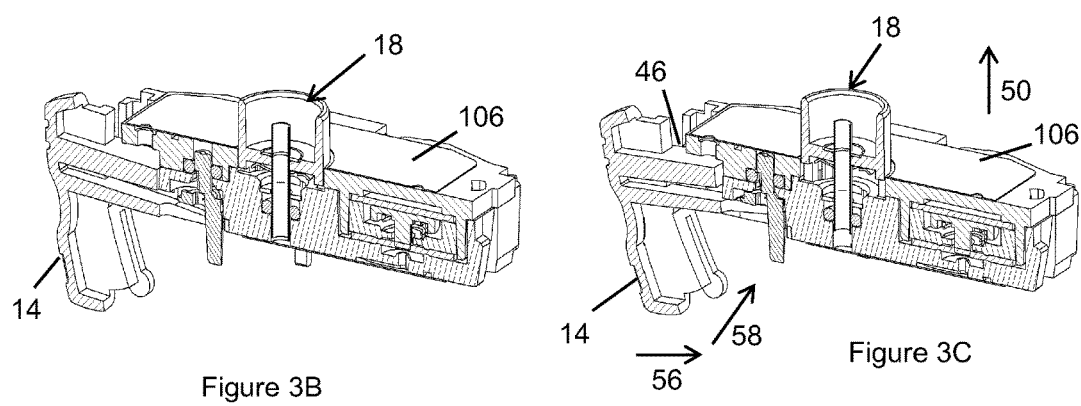
FIGS. 3B-3C are cross-sectional views of FIG. 1B showing an actuation of a module interface port 18.

Referring to FIGS. 3A-3C, switch 12 interacts with module interface port 18 to open valve 26 on fuel cartridge 20. Module interface port 18 has preferably two knobs 44 disposed on its side opposite from each other. Switch 12 has two corresponding yokes 46 that form a U-shaped end 48 adapted to fit around knobs 44, as best shown in FIG. 3A. U-shaped end 48 defines a space that is larger than knob 44, so that when ON segment 14 of switch 12 is pushed, the lower part of U-shaped end 48 lifts knob 44 and module interface port 18 in the direction of arrow 50 to move module interface port 18 and tube 40 toward cartridge valve 26 to open it. As switch 12 returns to its rest position due to the action of spring arms 52 against a hard surface on the fuel cell system (not shown), the extra space between the arms in U-shaped end 48 allows switch 12 to return to its neutral or rest position without retracting module interface port 18. This allows module interface port 18 to remain engaged to keep cartridge valve 26 open.

In some embodiments, module interface port 18 does not contain a shut-off valve and cartridge shut-off valve 26 is used as the fluidic shut-off valve for fuel cell system 21. Advantages of omitting a shut-off valve on module 10 include obviating the wear and tear of such a valve, which is used repeatedly, and minimizing the probability of failure of such valve. The advantages of relying on the cartridge shut-off valve 26 include that a fresh new valve is provided with each new cartridge. In other embodiments, module interface port 18 may include a shut-off valve. Such a shut-off valve may be used to prevent ingress of air or other materials into the system when a cartridge is not inserted, or may be used to enable system-controlled shut-off sequences.

From a neutral or rest position shown in FIG. 3B, yokes 46 are substantially parallel to module 10. In one embodiment, switch 12 has pivot boss 54 that allows switch 12 to pivot or rotate. As ON segment 14 is pushed in direction 56, yokes 46 are rotated in direction 58. This movement moves module interface port 18 in direction 50 to an engaged position shown in FIG. 3C, as discussed above.

Module interface port 18 further comprises a mechanical detent 45 that cooperates with another mechanical feature in module 10 to keep module interface port 18 in the engaged position shown in FIG. 3C after switch 12 has returned to its neutral position. Module interface port 18 further comprises leg 47 that protrudes through module 10 to actuate an electrical switch on a printed circuit board (PCB) that contains the fuel cell circuit whenever module interface port 18 is in the engaged position shown in FIG. 3C.

Figure 4A:
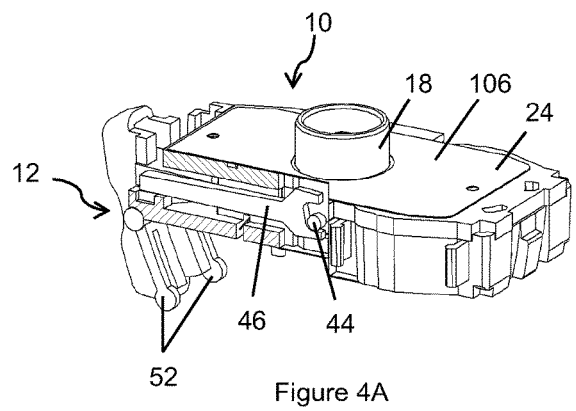
FIGS. 4A-4D are perspective view of the inventive integrated fluidic interface module 10 from reference surface 24 showing a sequence of actuation of module interface port 18 by switch 12.
Figure 4B:
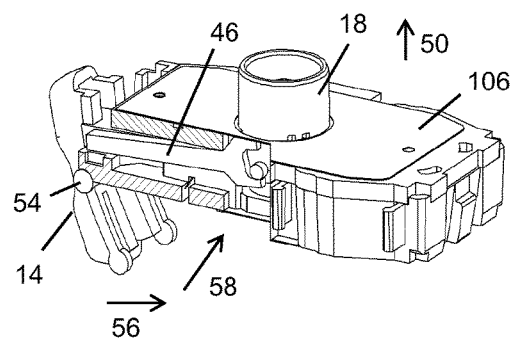
Figure 4C:
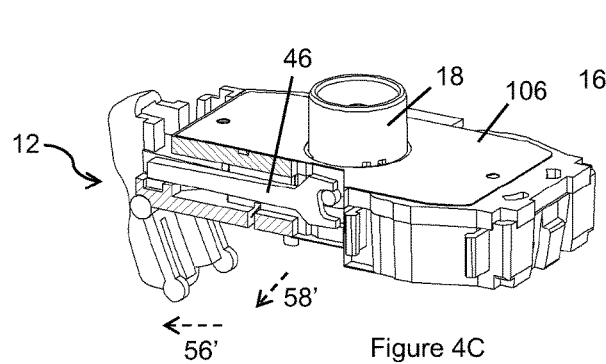
Figure 4D:
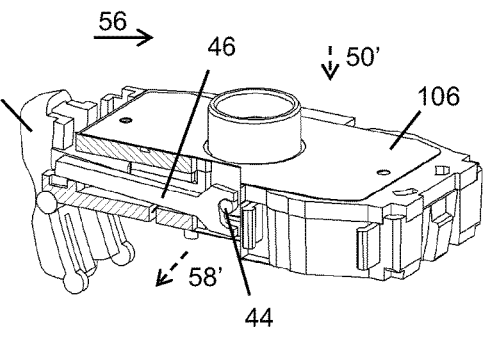

This sequence of operation of module interface port 18 is further illustrated in FIGS. 4A-4D. Module 10 shown in FIG. 4A is in the OFF state with module interface port 18 retracted with spring arms 52 maintaining switch 12 in its neutral position. A user moves ON segment 14 of switch 12 in direction 56 which rotates yokes 46 about pivot boss 54 in direction 58 and extends module interface port 18 in direction 50 to turn module 10 to the operating or ON position. Extending module interface port 18, as discussed above, opens shut-off valve 26 of cartridge 20 to commence fuel flow from the cartridge through module 10 to fuel cell system 21. As the user releases switch 12, spring arms 52 pushes against a hard surface on the fuel cell system (not shown) to move switch 12 and yoke 46 back in opposite direction 56' and direction 58', respectively, as shown in FIG. 4C. Module interface port 18 remains extended and the top of U-shaped end 48 of yoke 46 rests on knob 44 of module interface port 18. Module 10 should remain in the configuration shown in FIG. 4C while the fuel cell system is operating. To turn the fuel cell system OFF, the user moves OFF segment 16 of switch 12 in direction 56. This rotates yoke 46 in direction 58' to move knob 44 and module interface port 18 in direction 50' to retract module interface port 18 to return shut-off valve 26 in cartridge 20 to the closed position, as shown in FIG. 4D. As the user releases switch 12, module 10 returns to the configuration of FIG. 4A.

It is noted that in the configurations of FIG. 4B or FIG. 4D, a purge valve may be activated or armed at substantially the same time as ON segment 14 or OFF segment 16 of switch 12 is activated to purge the anode side of the fuel cells. The operations and structures of module IO's purge valve are discussed below. Also as module interface port 18 is extended as shown in FIG. 4B the fuel cell circuit is activated or turned ON, and as module interface port 18 is retracted as shown in FIG. 4D the fuel cell circuit is de-activated or turned OFF.

In another embodiment, module interface port 18 has its own shut-off valve that obviates the need for the module interface port 18 to advance toward and retract from the fuel cartridge. Once cartridge 20 is inserted, its own shut-off valve 26 remains open and the flow of fuel gas is controlled by the shut-off vale of the module interface port. This shut-off valve may be a passive mechanical valve, or it may be an electromechanical gas shut-off valve that can be controlled by the controller.

Figure 5:
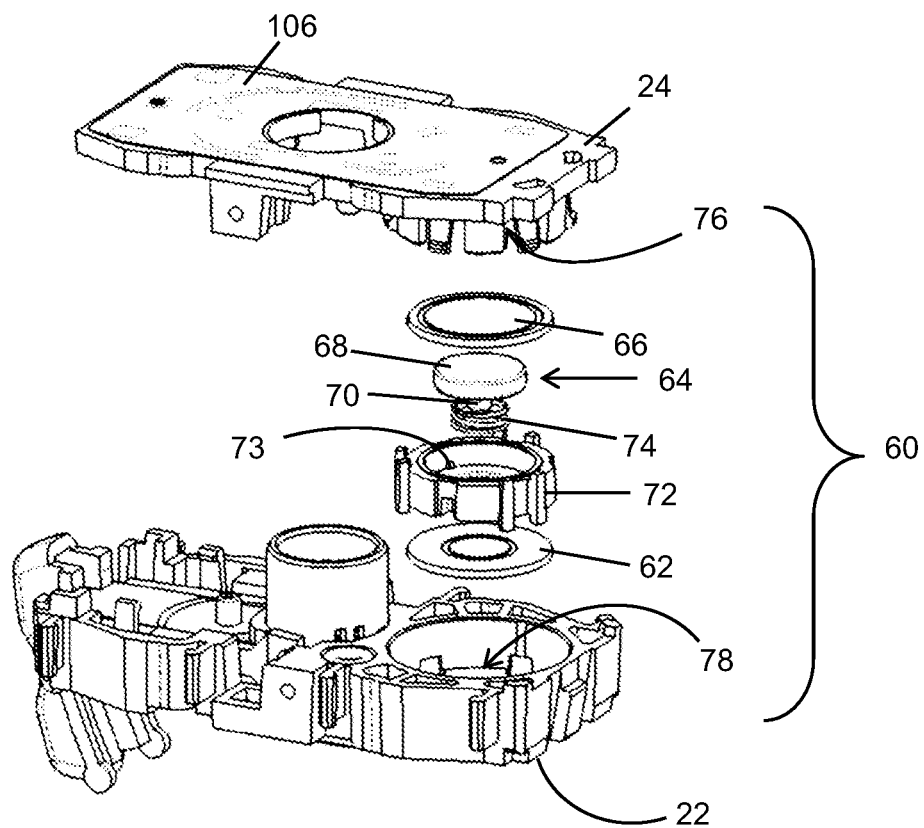
FIG. 5 is a partial exploded view of FIG. 1B showing the individual parts of pressure regulator 60.

After the fuel, e.g., hydrogen gas, enters module 10 through module interface port 18, the fuel's pressure is modulated by pressure regulator 60. As best shown in FIGS. 1C and 5, fuel enters through inner tube 30 and reaches top side 22 of module 10, where the fuel flows to the inlet side or high pressure side of pressure regulator 60. A suitable pressure regulator comprises inlet diaphragm or high pressure diaphragm 62, shuttle 64, outlet diaphragm or low pressure diaphragm 66. Shuttle 64 has larger end 68 in contact with outlet diaphragm 66 and smaller end 70 in contact with inlet diaphragm 62, and is housed in shuttle housing 72. Spring 74 is located inside pressure regulator 60 and is positioned between large end 68 of shuttle 64 and inlet diaphragm 62. The spring force of spring 74 and the resiliency of diaphragms 62 and 66, as well as the pressure in outlet chamber 76, determine the opening pressure or cracking pressure of pressure regulator 60. Inlet chamber 78 is located between inlet diaphragm 62 and a portion of top side 22 of module 10. Preferably, shuttle housing 72 is in fluid communication with a reference pressure. In one example, shuttle housing 72 is provided with at least one vent 73 to access atmospheric pressure.

The operations of suitable pressure regulators with movable shuttles are well described in commonly owned patents and patent applications, including U.S. Pat. No. 8,002,853 and published patent applications US 2010/0104481, US 2011/0189574 and 2011/0212374, and commonly owned patent application entitled "Fluidic Components Suitable for Fuel Cell Systems Including Pressure Regulators and Valves" U.S. patent application No. 13/832,528, granted as U.S. Pat. No. 9,312,550 on Apr. 12, 2016. The references are incorporated herein by reference in their entireties. Other types of suitable pressure regulators include but are not limited to those described in published patent applications US 2008/0233446 and WO 2011/127608. Any pressure regulator described in these references can be used with module 10. These references are incorporated herein by reference in their entireties.

Figure 6A:
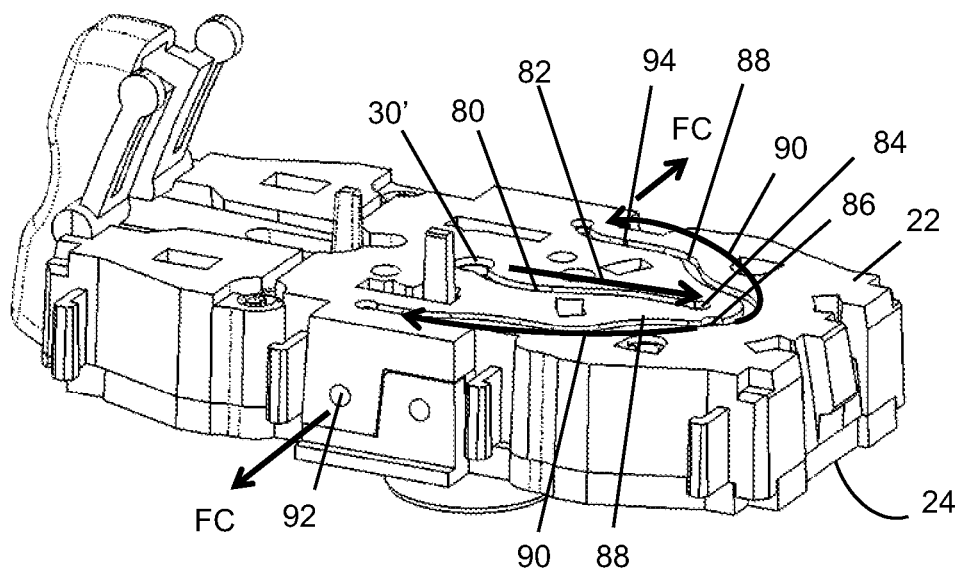
FIG. 6A is a perspective view from a reference surface 22 of the inventive integrated fluidic interface module showing a fuel manifold and FIG. 6B is a perspective view from reference surface 24 of the inventive integrated fluidic interface module showing a pressure feedback flow path.

Referring to FIG. 1C, fuel enters through tube 30 to reach top side 22 of module 10. At the terminal end 30' of tube 30, as best shown in FIG. 6A, fuel is directed to inlet channel 80 and flows in direction 82 to inlet 84 of pressure regulator 60. If the outlet pressure in outlet chamber 76 and the pressure exerted by spring 74 and diaphragms 62 and 66 are below the opening pressure of regulator 60, inlet diaphragm 62 flexes toward outlet diaphragm 66 and incoming fuel enters inlet 84 into inlet chamber 78, where it expands and undergoes a pressure drop due to the expansion.

Figure 7:
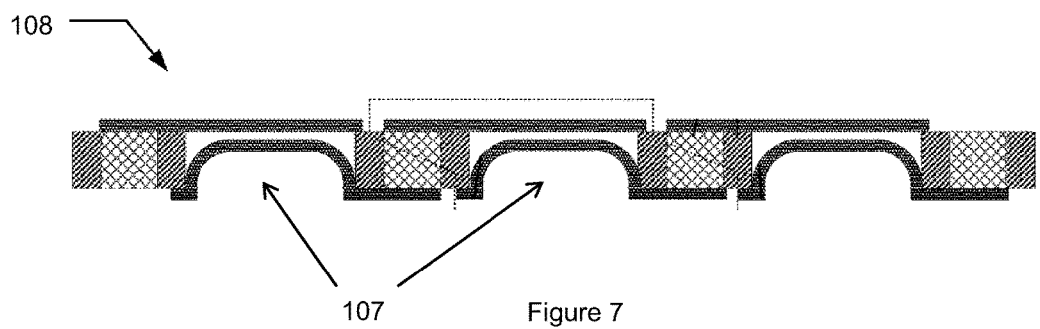
FIG. 7 is a cross-sectional view of an exemplary fuel cell.

After expanding and dropping pressure, the fuel exits pressure regulator 60 at outlet 86, as best shown in FIG. 6A, flows through outlet channels 88 in directions 90 and out of module 10 at module outlet 92 to the fuel cell(s) illustrated in FIG. 7, discussed below, and fuel cell system 21. Although two outlet channels 88 are shown, any number of outlets can be utilized.

Figure 6B:
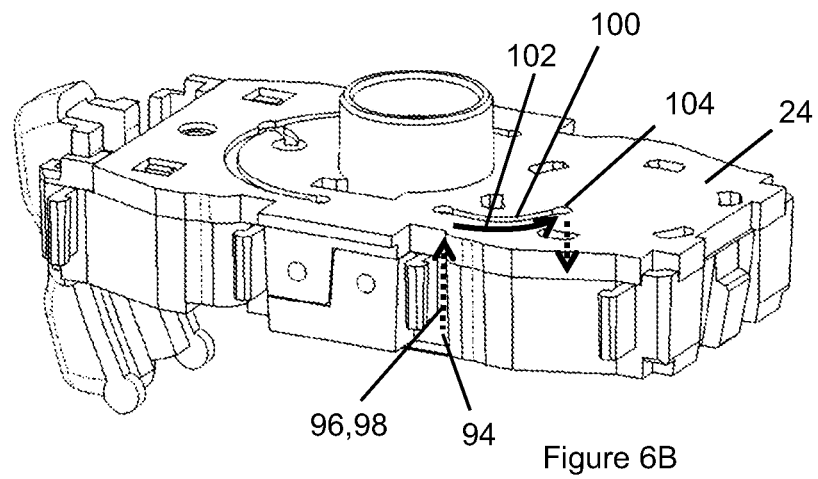

A pressure feedback structure is also provided to lead the outlet pressure and/or pressure in the fuel cells back to outlet diaphragm 66, so that pressure regulator 60 may close, i.e., shuttle 64 pushes inlet diaphragm 62 toward inlet 80 to stop the flow of fuel through the pressure regulator until the outlet pressure or fuel cell pressure decreases. A feedback port 94 is provided on outlet channel 88, shown in FIG. 6A. Port 94 is connected to first feedback channel 96 in direction 98 and along second feedback channel 100 along direction 102 to outlet chamber port 104, where the fuel outlet pressure can be sensed by outlet diaphragm 66, as best shown in FIG. 6B. It is noted that the pressure feedback structure has no dedicated exit, i.e., it is a blind hole, such that feedback flow directions 98 and 102 can be reserved depending on the flexing states of diaphragms 62 and 66.

Additionally, the flow channels shown in FIGS. 6A and 6B can be covered by a thin layer to create closed flow channels to keep the fuel from exiting the channels. These thin covers can be thin adhesive films made from materials that are inert to fuel cell fuels, such as hydrogen, oxygen or methanol. Such thin covering films are shown as element 106 in FIGS. 1C, 3A-C, 4A-D, SA, et seq., and can also be used to cover purge channels, described below.

In an alternative embodiment, coil spring 74, which is generally made from a metal or a metal alloy, is replaced by a molded feature such as a spring arm similar to spring arm 52 on switch 12. This molded feature may be constructed of metal or metal alloys, or may be constructed of plastics or other materials with suitable mechanical properties. Additionally, instead of providing inlet 84 and outlet 86 to pressure regulator 60 that are connected by a bypass channel, an internal channel through diaphragms 62 and 66 and shuttle 64 to connect outlet chamber 76 to inlet chamber 78. This bypass channel is spaced apart from shuttle 64 and diaphragms 62 and 66 and connects outlet chamber 76 to inlet chamber 78. Pressure regulators with an internal channel through the diaphragms and shuttle are fully disclosed in commonly owned PCT publication No. WO 2013/093646, more specifically in FIGS. 8A-D of said PCT publication. WO 2013/093646 is incorporated herein by reference in its entirety.

Integrated fluidic interface module 10 also comprises a purge system or purge valve (hereinafter designated with reference number 109 or 109') to remove residual gas from the anode plenum in the fuel cells. An exemplary fuel cell 108 is illustrated in FIG. 7, which shows side-by-side planar PEM fuel cells disclosed in commonly owned published international application WO 2011/079377. Other suitable fuel cells, including planar and stacked fuel cells, are discussed below. Residual gases including byproducts, inert gases and water vapors can collect on the anode side 107 of fuel cell 108. It is desirable to purge these residual gases from anode 107 periodically, or at system start up or at system shut-down using fuel, such as hydrogen gas, from fuel cartridge 20. Purging the fuel cells or the fuel cell system is venting the anode plenum. In one embodiment, when a purge valve is opened fuel enters module 10 flowing through pressure regulator 60 and out of module outlet 92 to anode 107 of fuel cell 108. The fuel gas pushes the residual or inert gas from the anode back to module 10 and through the purge valve and out to vent.

One embodiment of the purge valve system, described below and illustrated in FIGS. 8A-10B, purge valve 109 is manually activated by a user preferably to start the fuel cell system, e.g., by pushing ON segment 14 of switch 12. Purge valve 109 remains ON or opened when the switch returns to its neutral or rest position. In other words, the closing of the purge valve is not connected to switch 12. Instead, purge valve 109 is closed or moved to the OFF position when the fuel cell reaches a steady level after a start-up conditioning process to produce electricity. The conditioning process is a start-up process, where fuel cells heat and humidify themselves. The electricity from the fuel cell is conducted through a resistive load, which heats up the resistive load. When heated to a predetermined level, the resistive load such as a shape memory alloy changes its shape or contracts back to a shape that it remembers and closes the purge valve or moves it to the OFF position. The resistive load may include a SMA and other resistive elements, which may preferentially located to speed up the warming process. This inventive purge valve system is therefore manually or mechanically actuated and electrically and/or thermally de-actuated. In other words, purge valve 109 is a semi-automatic purge valve. The present invention relies on the fuel cell's ability to produce enough power to actuate the resistive load/shape memory alloy load to close the purge valve. The present invention does not rely on sensors or control systems to detect whether the anode is filled with hydrogen. The present invention uses the fuel cell both as a hydrogen gas sensor and as a power source to close the purge valve.

Figures 9A, 9B, 9C:
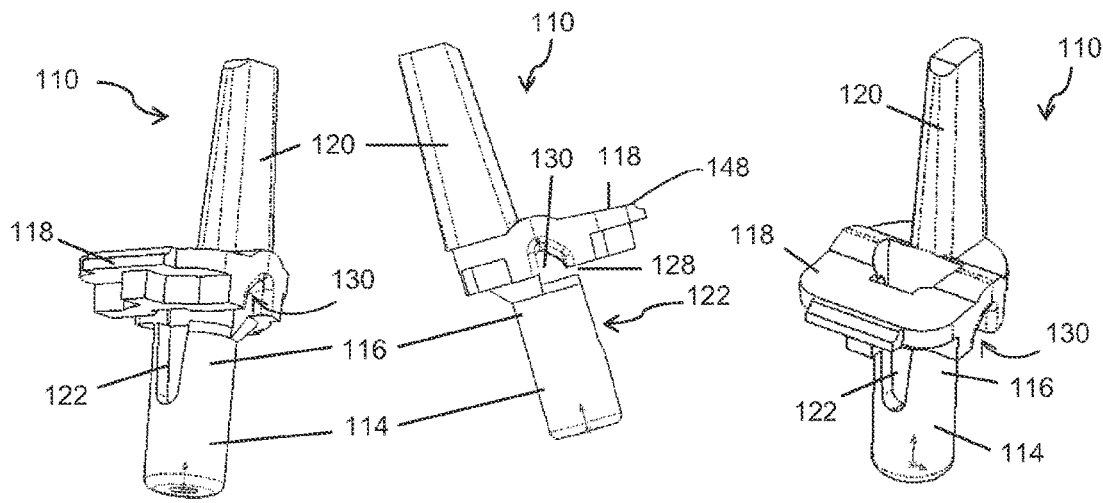
FIGS. 9A-9C are three perspective views of the inventive purge shuttle.
Figure 10A:
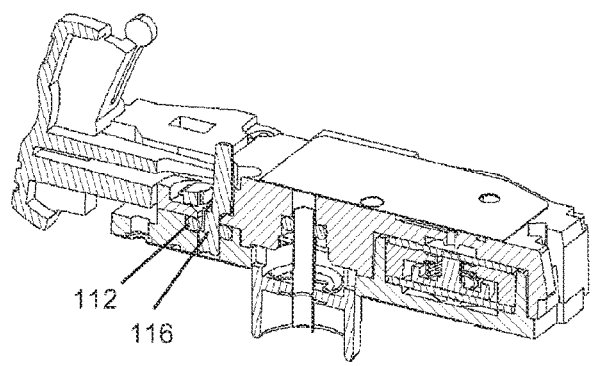
FIGS. 10A-10B are similar to FIG. 8C showing the open and closed configuration, respectively, of the inventive purge valve.
Figure 10B:
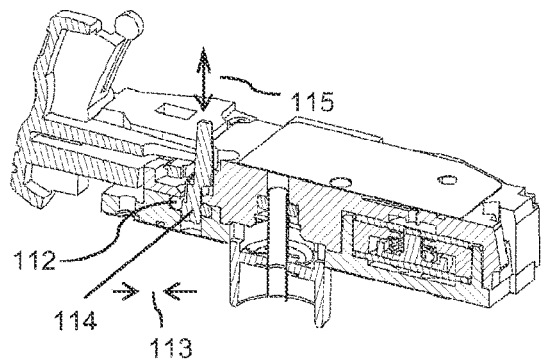

The inventive purge system 109 in module 10 comprises at least a purge shuttle 110 that cooperates with a sealing member 112, such as an O-ring or a sealing disk, as shown in FIGS. 1C, 8A-8D and 10A-10B. As best shown in FIGS. 9A-9C, shuttle 110 comprises a sealing portion 114, an open portion 116, a shoulder 118 and an optional extension 120. Open portion 116 contains a cut-out or an open notch 122, which is a cut-out that lets residual gases through to exit. In a closed configuration as shown in FIG. 10B, sealing portion 114 of purge shuttle 110 is positioned next to sealing member 112. In an open configuration to vent gases shown in FIG. 10A, open portion 116 and notch 122 are positioned next to sealing member 112 to create a flow path through notch 122 and purge shuttle to vent residual gas.

Referring to FIG. 10B, the compressive force exerted by compressed sealing member 112 on sealing portion 114 of purge shuttle 110 is in direction 113, and the actuation force that moves shuttle 110 from the closed configuration of FIG. 10B to the open configuration of FIG. 10A is in direction 115. Directions 113 and 115 are substantially perpendicular to each other. The diameters of sealing portion 114 and open portion 116 are substantially the same, and these diameters are larger than the inner diameter of sealing member 112, so that sealing member 112 is compressed and exerts a force in direction 113. There is no other axial or longitudinal force other than friction or no biasing force from a spring that acts on purge shuttle 110 when it moves, thereby enabling purge shuttle 110 to remain in the closed position and to remain in the open position, once purge shuttle 110 is so moved.

Figure 8A:
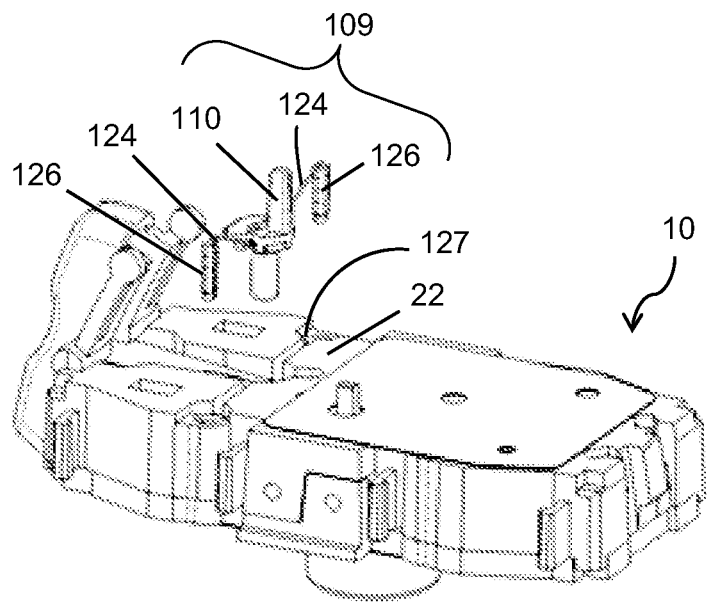
FIG. 8A is a partial exploded view from reference surface 22 of the inventive integrated fluidic interface module showing an inventive purge valve.

Referring to FIG. 8A, purge shuttle 110 is supported on a wire 124 that is suspended on two posts 126, which are anchored on the body of module 10. Module 10 has a channel 127 that is sized and dimensioned to store wire 124. Wire 124 is inserted under shoulder 118 of purge shuttle 110. As best shown in FIG. 9B, purge shuttle 110 has a slit 128 which opens to channel 130. Slit 128 is sized and dimensioned to allow wire 124 to slip through and be loosely held within channel 130. In one embodiment, wire 124 is made from or comprises a material that reverts to an original shape when heated to a predetermined temperature. A suitable material for wire 124 is a shape memory alloy (SMA). SMA materials are electrically conductive and electrically resistive, such that when an electrical current, e.g., from fuel cell 108, flows through it the current also heats the SMA wire. Suitable SMA materials include, but are not limited to, nickel-titanium or nitinol, which is commercially available as Flexinol™. Other suitable SMA materials include the alloys of Ag—Cd, Au—Cd, Cu—Al—Ni, Cu—Sn, Cu—Zn, Cu—Zn—X (X=Si, Al, Sn), Fe—Pt, Mn—Cu, Fe—Mn— Si, Pt alloys, Co—Ni—Al, Co—Ni—Ga, Ni—Fe—Ga, Ti—Pd in various concentrations, Ni—Ti—Nb and Ni—Mn—Ga. Wire 124 forms a part of purge valve 109.

In this embodiment, when the user activates ON segment 14 of switch 12, the user also opens the purge valve. Switch 12, as best shown in FIG. 8B, in addition to yokes 46 also has purge valve pusher 132, which terminates in two fingers 134. Fingers 134 push down on shoulder 118 of purge shuttle 110 in direction 58, discussed above. This motion moves purge shuttle 110 to the open configuration of FIG. 10A. Extension 120 of purge shuttle 110 disconnects the external load (e.g., an electronic device) from the fuel cell and connects wire 124 to the fuel cell. As the residual gases are purged from anode 107 and replaced by hydrogen fuel, fuel cell 108 produces more electricity, which conducts through wire 124 and heats the wire. As the fuel cell production reaches a desired or steady state level indicating that the purge process is complete, wire 124 is sufficiently heated to return to its memorized shape, i.e., it contracts its length to pull purge shuttle back to its closed configuration as shown in FIG. 10B. Once the purge shuttle is back to the closed configuration, wire 124 is disconnected from the fuel cell circuit, and the external load is reconnected to the fuel cell. Wire 124 is allowed to cool and return to its longer length.

Figure 10C:
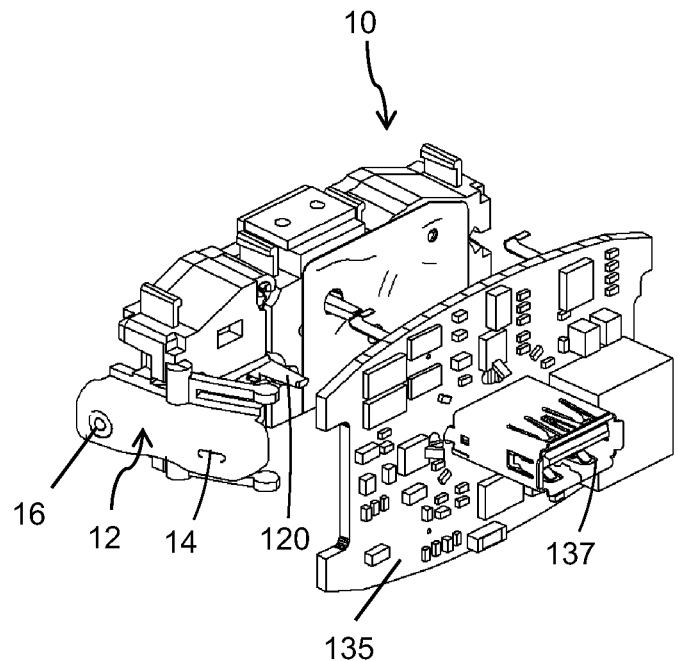
FIG. 10C is an exploded view showing the inventive integrated fluidic interface module with a PC board.

As shown in FIG. 10C, PC board 135 which contains the electrical circuitry, among other things, is disposed adjacent to side 22 of interface module 10. PC board 135 preferably has an electrical output port 137, such as a USB port, to conduct the electricity generated by the fuel cells 108 to an external load or electronic device. External load includes, but is not limited to, DC-DC converter, power conditioning elements, electrical regulator and other electrical components necessary to provide regulated power to the electronic device.

Referring to FIGS. 8C-8E, residual gases to be purged flow in direction 136 enter module 10 through purge port 138. Inside module 10, the residual gases flow through purge channel 140 along direction 142 and exit module 10 via notch 122 of open portion 116 on purge shuttle 110 along direction 142, as shown in FIG. 8D. Residual gases include inert gases, water vapors and condensed water that migrate into the anode plenum through the polymer exchange membrane (PEM) when the fuel cell system is inactive and through the fuel conduits when no fuel cartridge is connected to the system.

Hence, purge valve system 109 of the present invention is manually activated when the fuel cell system is turned on by the user by pushing switch 12 and is automatically de-activated when the fuel cell is sufficiently purged. The fuel cell itself determines when the anode chamber(s) is sufficiently purged, which coincides with the production of electricity when hydrogen gas replaces the residual gases. The de-activation process itself, which occurs automatically, preferably does not consume electricity after the fuel cell is fully conditioned. The power produced by the fuel cell during this transient conditioning period, which is not useful to power a device, is used to heat up wire 124. The power produced during the conditioning period can also be used to heat other components in the fuel cell system 21. No useful electricity needs to be used to de-activate purge valve system 109.

The length and width of wire 124 can be readily ascertained with the steady state output and/or the output during the conditioning of the fuel cell, the thermal conductivity and thermal capacitance of the SMA material, the temperature at which the SMA material reverts to its memorized shape, the amount of retraction by the SMA material, and the force necessary to move purge shuttle from the closed configuration to the open configuration. These factors can be readily look up or measured.

An advantage of this purge valve system is that if the fuel cell is insufficiently purged the valve remains open until the purge process is complete and fuel such as hydrogen gas is reacted in the fuel cell to produce electricity.

The advantages of semi-automatic purge valve 109 over conventional purge valves are readily apparent. Manually operated purge valves may be purged too short which leaves residual gases in the fuel cell, or too long which wastes fuel gas. Elapsed or timed purge valves suffer the same disadvantages as manually purged valves, and they require extra components for the timing mechanism. Electronically actuated purge valves require power from the fuel cells operating in steady state, and extra parts such as solenoid valves and sensors. Electronically actuated valves also cannot be operated at start-up due to the lack of steady state power, or cannot work without an independent power source, such as batteries. Electronically actuated valves also need a microprocessor or controller to function. The deficiencies of conventional purge valves are remedied by the purge valve 109 described above and shown in FIGS. 8A-10B, and inverse purge valve 109' described below.

In another embodiment, this purge valve with SMA wire 124, purge shuttle 110 and sealing member 112 can be deployed as a safety shut-off for a large number of applications to shut off any system when the system temperature, which triggers the SMA wire, reaches a certain predetermined level. Purge shuttle 110 can act like an electrical switch that opens a circuit when the SMA wire retracts. A manual reset, by manually pushing the purge shuttle, is necessary to close the circuit to restart the system.

This safety shut-off feature can be applied to shut down a fuel cell system when it is idle. When there is no load on the fuel cell, e.g., when no electronic device is connected to a fuel cell charger, the electrical current can be diverted to purge valve 109 to heat SMA wire 124 to retract and turn the fuel cell off. In one example, an SMA wire can be connected to module interface port 18. If the fuel cell system overheats, then the SMA wire retracts in direction 50' to withdraw tube 30 from shut-off valve 26 to turn the system off. This action is the equivalent of shutting down the system without pushing OFF segment 16 of switch 12. In another example, a simple circuit is connected between SMA wire 124 of the purge valve 109 or 109' and USB port 137. A temperature sensor, such as a thermistor, connected to a gate is positioned on this circuit. When a threshold temperature is reached the gate opens to isolate the USB port from the fuel cell circuit and connects this circuit to SMA wire 124 to retract the wire to close the system. In another example, the material of SMA wire 124 is selected to retract at or proximate to the system shut-off temperature to shut the system down automatically when the system temperature reaches the shut-off temperature. In another example, a processor or microprocessor preferably located on PCB board 135 directs electrical current to SMA wire 124 after a pre-determined period of inactivity.

Figures 11, 13:
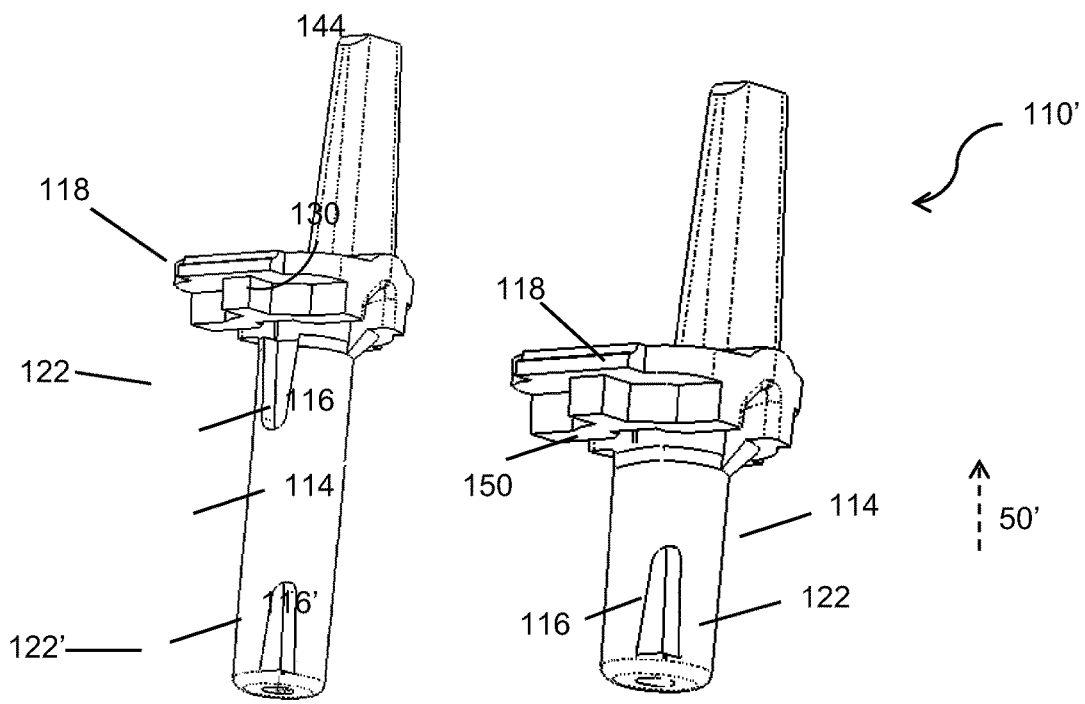
FIG. 11 is a perspective view of an alternative purge shuttle.
FIG. 13 is a perspective view of another alternative purge shuttle.

In another embodiment, the purge shuttle may have two open portions 116 and 116', as best shown in FIG. 11, and designated as double-ended purge shuttle 144. Double-ended purge shuttle 144 can be used as a fluid control in a manifold. For example, one SMA wire 124 can be positioned in channel 130 below shoulder 118 and a second SMA wire 124 can be positioned above shoulder 118. The fuel cell or another electrical system or a controller can selective activate one specific wire 124 to move purge double-ended shuttle 144 to first open section 116 and active the other wire 124 to move double-ended purge shuttle 144 to the other open section 116'. A third SMA wire 124 of different length can be positioned either above or below shoulder 118 to move double-ended purge shuttle 144 to sealing portion 114. By varying the position of double-ended purge shuttle 144, a specific flow channel in a manifold can be selected.

Figure 10D:
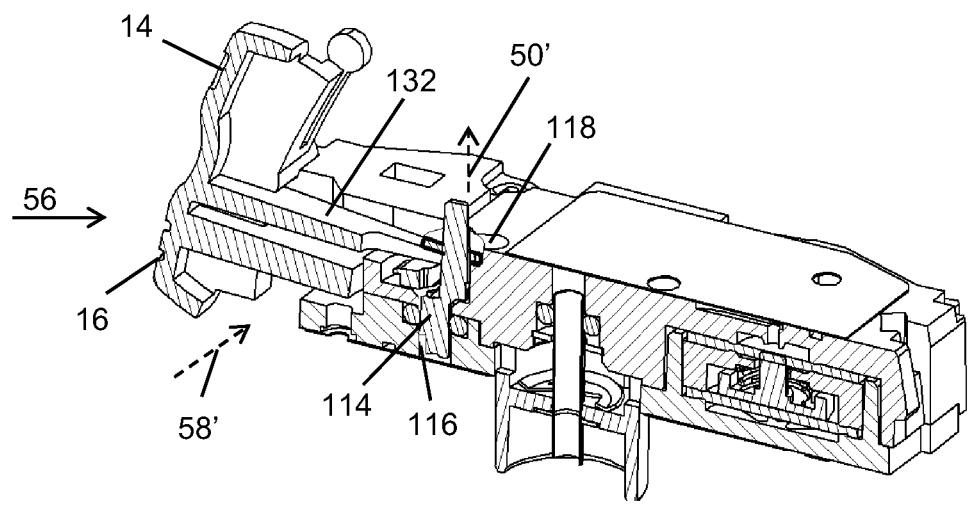
FIG. 10D is a cross-sectional view of the inventive integrated fluidic interface with an inverse purge valve.

In another embodiment, purge valve 109' operates in an inverse manner. Inverse purge valve 109' is armed or opened when the fuel cell system is turned OFF. In this configuration, when the fuel cell system is OFF inverse purge valve 109' is open, the fuel cell system is ready to be purged when the fuel cell system is turned ON again. Similar to the embodiment discussed above, the fuel cell closes inverse purge valve 109' with the electricity it produces. A minor adjustment to switch 12 is made to accomplish this sequence. Referring to FIG. 8B, purge valve pusher 132, which is shown to be associated with the ON segment 14 of switch 12, can be relocated and be attached to the OFF segment 16 of switch 12, so that actuation of OFF segment 16 would move inverse purge valve to the ON configuration. Alternatively, switch 12 and purge valve pusher 132 may remain substantially the same as shown in FIG. 8B and purge shuttle 110 is modified as shown in FIG. 13 to be an inverse purge shuttle 110' with open portion 116 located at one end and sealing portion 114 away from the end. Additionally, shoulder 118 of the purge shuttle is relocated to be on the opposite side of purge valve pusher 132. As shown in FIG. 10D, as OFF segment 16 is pushed in direction 56 moving purge valve pusher 132 in direction 58', purge valve pusher 132 moves purge shuttle 110' in direction 50' to align open portion 116 with the seal 112 to open and arm inverse purge valve 109' to vent the next time the system is turned ON.

One advantage of inverse purge valve 109' is that the valve would not purge even if a user repeatedly presses ON segment 14 of switch 12, while the fuel cell system is in operation, or holding ON segment 14 down for an extended time, since inverse purge valve 109' is decoupled from ON segment 14. Purging the system while the fuel cell is in full operation would waste fuel, disrupt the operation of the fuel cell, damage SMA wire 12 and cause other adverse effects.

Another advantage of inverse purge valve 109' is that while the fuel cell system is running, a purge operation cannot occur to prevent over-purging. The user would first turn the system OFF by actuating OFF segment 16, which turns the entire system OFF and open the purge valve, and then the user would actuate ON segment 14 to turn the fuel cell system back ON and to purge the system.

Another advantage of the inverse purge valve 109' is that when the fuel cell system is shut down and with inverse purge valve 109' in the open configuration, the anode and the rest of the fuel cell system depressurize and reach equilibrium with the ambient environment. This may reduce the amount of water condensation within the fuel cell system as the fuel cell cools, thereby lessening the purge duration on the next startup.

Figure 12:
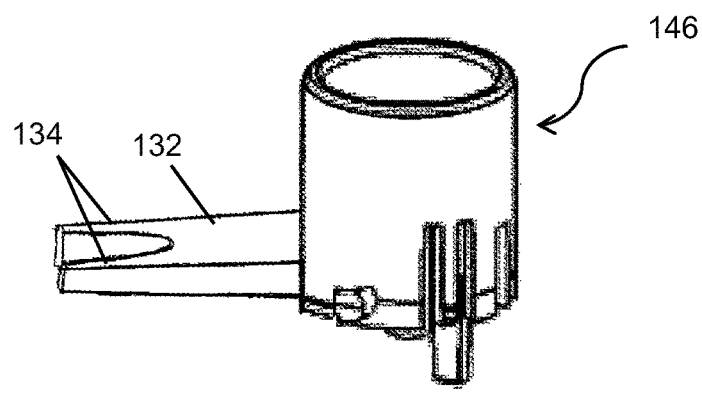
FIG. 12 is a perspective view of an alternative module interface port.

In yet another embodiment, purge valve pusher 132 is connected to module interface port 146 as shown in FIG. 12, which is moved by switch 12 to an extended position in direction 50 to connect to cartridge 20 or to a refracted position in direction 50' to disconnect from cartridge 20 as discussed above. As module interface port 146 is moved in direction 50, which has the same motions as module interface port 18 shown in FIGS. 3B-3C, purge valve pusher 132 would push purge shuttle 110 in direction 50. In this embodiment pusher 132 would be positioned on surface 148 of shoulder 118, as illustrated in FIG. 9B. This would position notch 122 and open portion 116 opposite of sealing member 112 thereby turning the purge valve 109 to the open configuration.

A modification to the purge shuttle allows the purge system in the preceding paragraph to operate in the inverse manner, i.e., turning the system off would open the purge valve. As shown in FIG. 13, purge shuttle 110' is similar to purge shuttle 110 except that the locations of sealing portion 114 and open portion 116 of the shuttle are switched. When module interface port 146 retracts as the system shuts down or turning OFF, purge valve pusher 132, which is attached to module interface port 146 and is in contact with surface 150 of shoulder 118, moves in direction 50' to position open portion 116 and notch 122 opposite of sealing member 112 to open the purge valve.

It is noted that in the embodiments where purge valve pusher 132 is attached to module interface port 146, pusher 132 is positioned at surface 148 or 150 of shoulder 118, so that module interface port 146 can only manually move the purge shuttle 110, 110' in one direction 50 or 50'. SMA wire 124 is located on the opposite surface to automatically close the purge valve.

The purge system using module interface port 146 and purge shuttle 110' in the inverse manner confers a number of advantages, including the situation where every time a new cartridge 20 is inserted into the fuel cell system, inverse purge valve 109' is moved to or remains in the open configuration and the fuel cell system is ready to be purged. When an old or empty cartridge 20 is removed and switch 12 is turned OFF, then module interface port 146 is retracted and purge valve 109' with purge shuttle 110' is in the open configuration and the fuel cell system is ready to be purged when a fresh cartridge is inserted and switch 12 is turned ON.

However when the old or empty cartridge 20 is removed and switch 12 remains in the ON position, module interface port 146 remains extended and purge valve 109' remains in the closed configuration. Advantageously, when a fresh cartridge is inserted the cartridge due to friction and contacts with module interface port 146, the insertion motion pushes module interface port 146 to the retracted position and purge valve 109' is in the open configuration and the fuel cell system is ready to be purged at the next start up.

Hence, the purge system using module interface port 146 and purge shuttle 110' operating in the inverse manner assures that when a fresh cartridge is used for the first time the fuel cell system is ready to be purged at the next start up, as well as after turning the fuel cell system OFF and then ON again.

Another purge valve 200 is illustrated in FIGS. 18A-F. Similar to purge valves 109 and 109' described above, purge valve 200 also comprises SMA wire 124. In this embodiment, SMA wire 124 is stretched by a pre-stressed cantilever beam in the OFF position and in the ON position and has substantially the same longer length in both the OFF and ON positions. The purge valve 200 is maintained in the ON position by a latch mechanism, and is spring loaded so that the valve returns to the OFF position unless it is held in the ON position by the latch mechanism or contraction by the SMA wire. To move valve 200 from the ON position to the OFF position, SMA wire 124 is temporarily heated by the fuel cell 108 as the anode 107 is purged and hydrogen fuel gas fills the anode sufficiently to allow the fuel cell 108 to generate sufficient current to heat and shrink SMA wire 124. As SMA wire 124 shrinks, it pulls on the cantilever beam and releases the latch mechanism and the pre-stressed cantilever beam returns to the OFF position and stretches SMA wire 124 when the heating stops. Hence, purge valve 200 is another semi-automatic valve that may be opened manually, preferably when a user pushes an ON button and unlike valve 109 and 109' held in the ON position by a spring-loaded latch mechanism and in the OFF position by a pre-stressed cantilever beam, and is automatically closed by the electrical current generated by the fuel cell. Advantageously, purge valve 200 may also be intermittently opened as necessary after the user pushes the ON button during the operation of the fuel cell system for as long as desired by applying a temporary current to the SMA wire. Elements that are similar between purge valves 109/109' and 200 may share the same reference numbers.

Figure 18A:
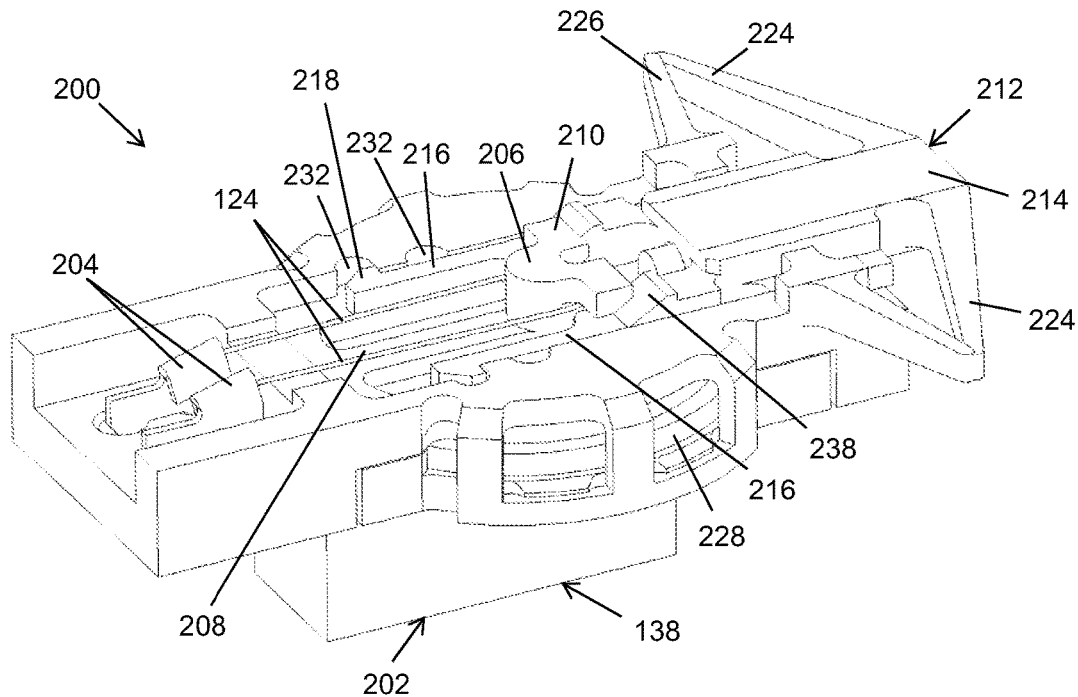
FIGS. 18A-C are perspective views of another purge valve in the off, on and release configurations.
Figure 18B:
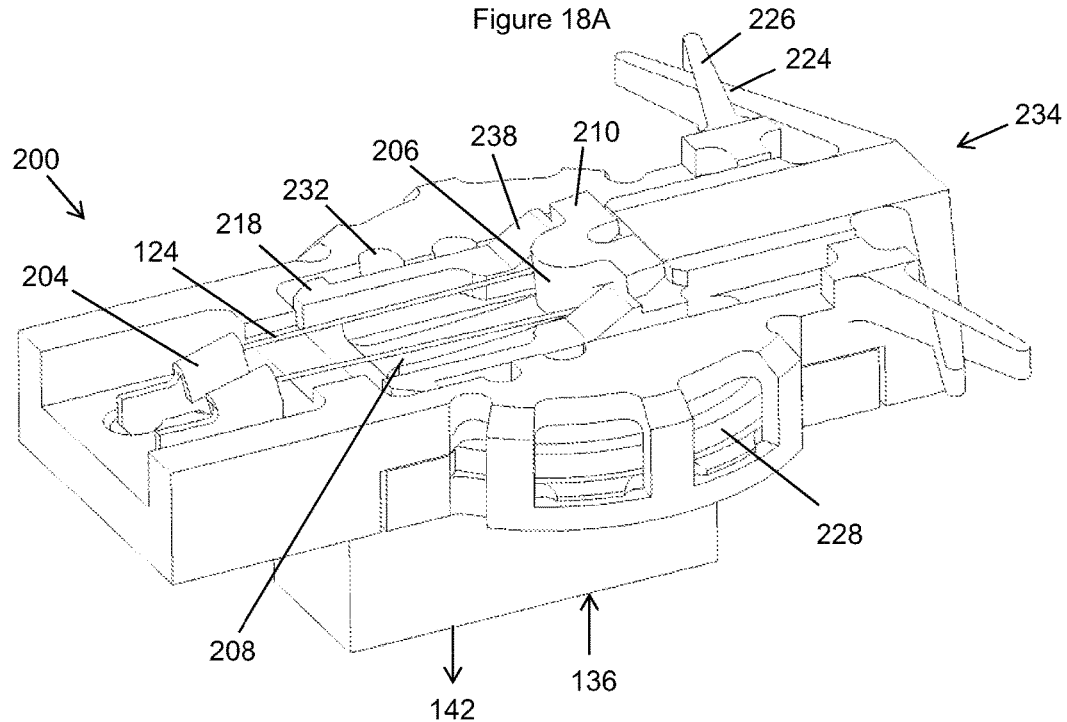
Figure 18C:
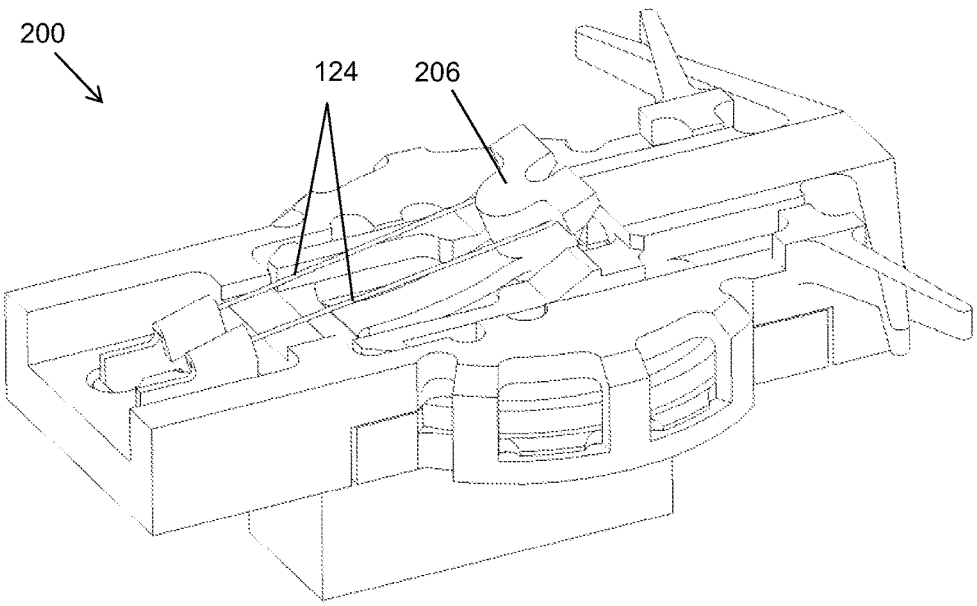
Figure 18D:
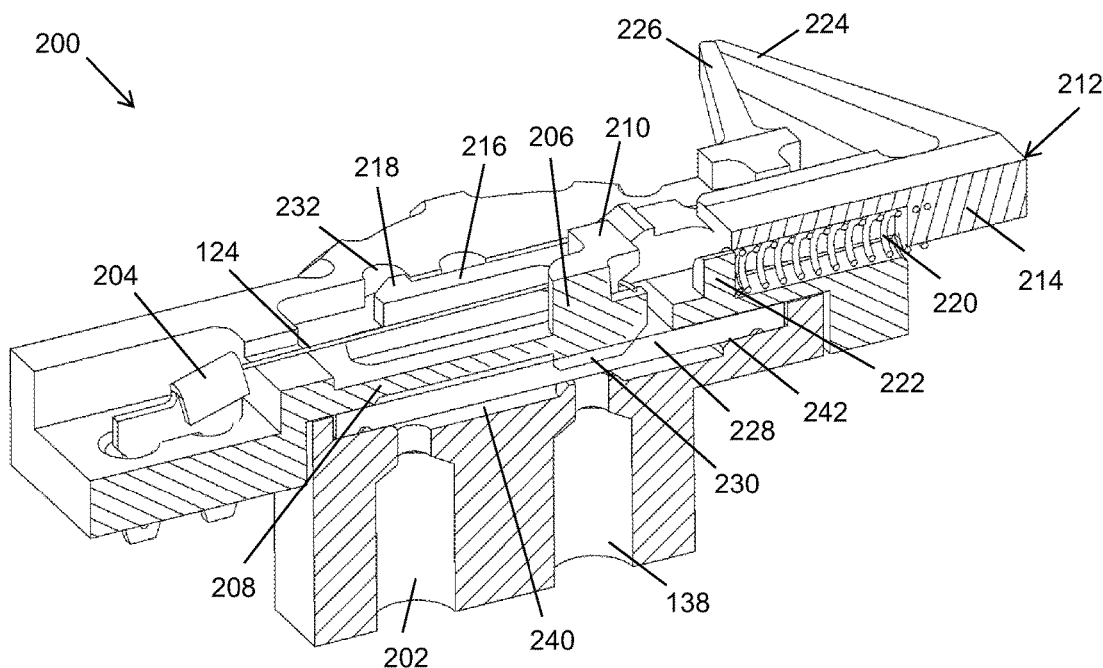
FIGS. 18D-F are cross-sectional views along the longitudinal axis of the purge valve shown in FIGS. 18A-C, respectively
Figure 18E:
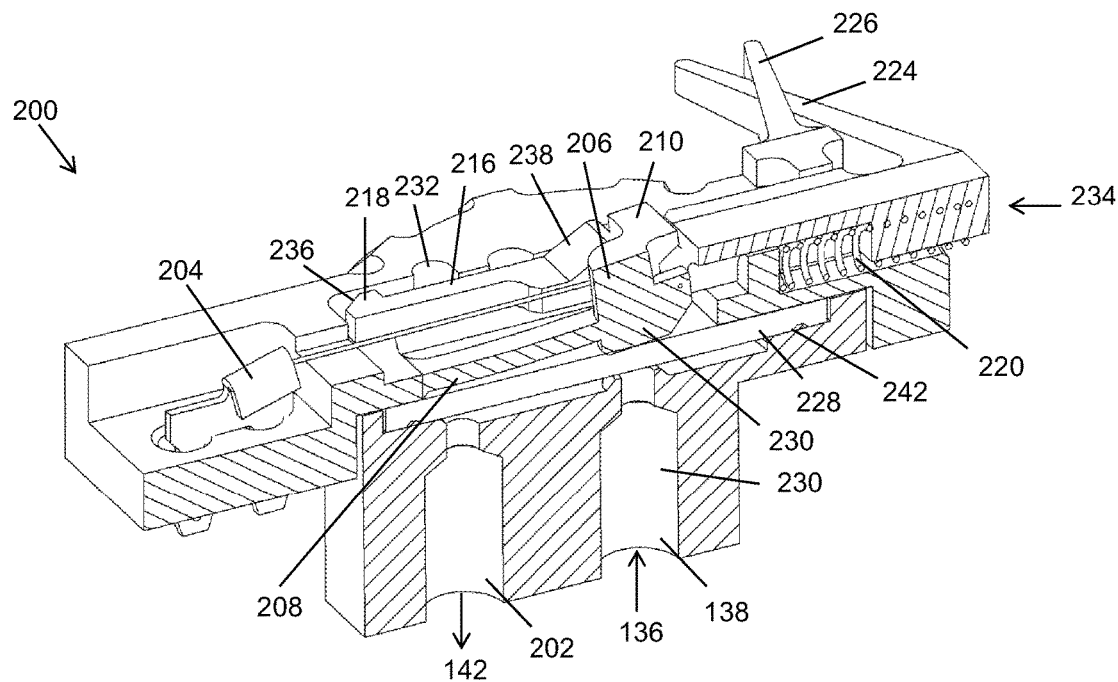
Figure 18F:
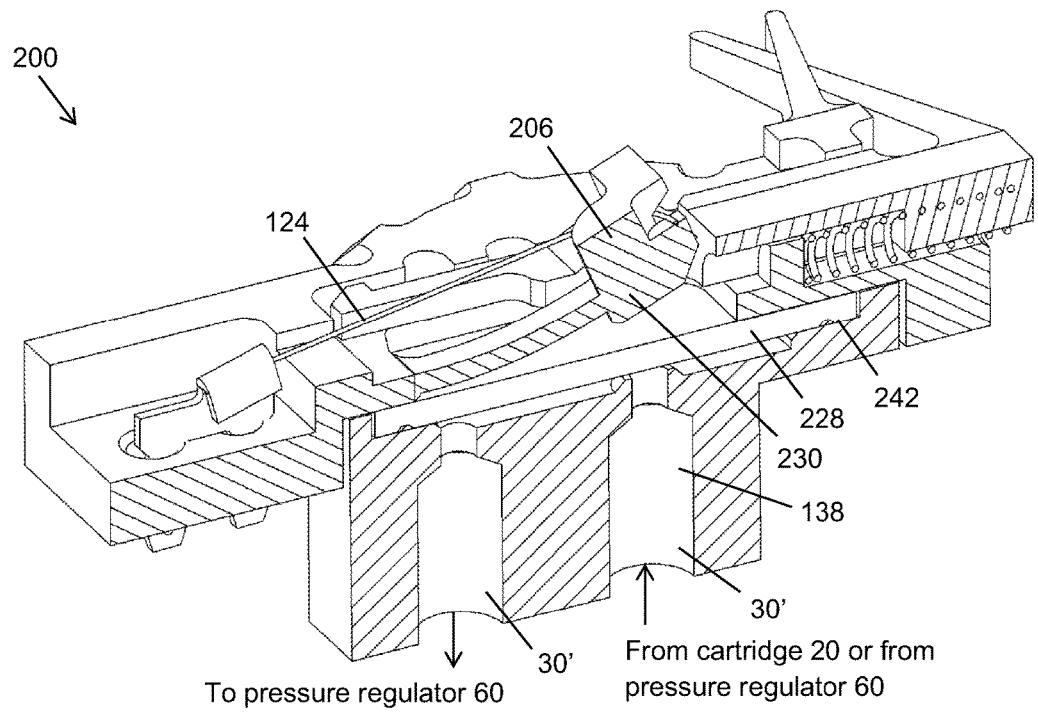

FIGS. 18A-C show a sequence of purge valve 200 from the OFF position to the ON position and the released position, respectively. FIGS. 18D-F show the same sequence but using cross-sectional views along the longitudinal axis of valve 200.

Referring to FIGS. 18A and 18D which shows purge valve 200 in the OFF or closed position, valve 200 has inlet 138 where the gas to be purged flows into purge valve 200 in direction 136 and out of outlet 202 in exiting direction 142. Flow directions 136 and 142 of the gas to be purged and the purge inlet 138 are shown in FIGS. 18D and 18E. Purge valve 200 also has SMA wire 124, which is anchored to the valve body at end 204. SMA wire 124 wraps around free end 206 of cantilever beam 208. Free end 206 has a shoulder 210 that retains SMA wire 124 in place. Cantilever beam is pre-stressed such that free end 206 is biased downward onto the raised ridge or lip of inlet 138 to close the valve. Purge valve 200 also has a movable biased slider 212, which has main body 214 and forked legs 216 with hooked ends 218. Forked legs 216 form a spring and store energy when legs 216 are pressed toward each other, as discussed further below.

Slider 212 is biased toward the OFF position shown in FIGS. 18A and 18D by one or more springs. A helical spring 220 can be positioned between ledge 222 on the valve body and main body 214 of slider 212 to push slider 212 toward the OPEN position. Additionally, spring arms 224 can also be positioned on main body 214, as shown, that can flex to store potential energy when slider 212 is moved to the ON position, as best shown in FIGS. 18B and 18E. Additionally, the valve body may also have spring arms 226, which can flex to store energy when slider 212 is moved to the ON position;

Purge valve 200 further comprises a flexible diaphragm 228 fluidically disposed between inlet 138 and outlet 202. In the OFF position, extension 230 of free end 206 pushes diaphragm 228 toward the raised ridge on inlet 138 to close inlet 138 preventing the gas to be purged from flowing through valve 200. Diaphragm 228 preferably is made from an elastomeric material that can seal inlet 138, and in its relaxed or un-stretched state is sized and dimensioned to form a space 240 or flow path above the raised ridge on inlet 138 connecting inlet 138 and outlet 202, as best shown in FIG. 18D. Extension 230 preferably has a larger diameter than inlet 138, and due to the downward extending force from the pre-stressed cantilever beam 208 extension 230 presses diaphragm 228 against the raised ridge of inlet 138 to seal the inlet.

To maintain valve 200 and slider 212 in the OFF position, the valve body has notches 232 defined thereon and notches are sized and dimensioned to receive hooked ends 218 of forked legs 216 of slider 212, as best shown in FIGS. 8A and 8D. Due to the spring-like property of forked legs 216, hooked ends 218 are retained in notches 232 and slider 212 and valve 200 are held in the OFF position.

To open valve 200 to purge the anode side of fuel cells 108, a user pushes an ON button mechanically attached to slider 212 in direction 234, as shown in FIGS. 18B and 18E, compressing coil spring 220 and flexing spring arms 224, 226. Although shown in FIGS. 18B, 18C, 18D and 18F as overlapping, spring arms 224 and 226 do not overlap each other, but are flexed or displaced by a combined amount substantially equal to the overlapping amount shown. It is noted that only one set of spring arms 224 or 226 may flex. Activation of the ON button or pushing slider 212 in direction 234 also pushes hooked ends 218 away from notches 232 due to first ramp 236 on the distal ends of forked legs 216 toward end 204. This movement also engages slider 212 to cantilever beam 208. Free end 206 and its shoulder 210 rides over second ramps 238 until shoulder 210 catches second ramps 238, as best shown in FIGS. 18B and 18D, and slider 212 is retained in or latched to the ON position. Hence, shoulder 210 and second ramps 238 for the latching mechanism that retains slider 212 or valve 200 to the ON position. The movement from the OFF position (FIG. 18A) to the ON position (FIG. 18B) does not significantly alter the length of SMA wire 124.

Also, in the ON position free end 206 is lifted upward by second ramps 238 and moves extension 230 of free end 206 away from the raised ridge of inlet 138. The flexibility or spring-like property of diaphragm 228 is designed such that when extension 230 moves away from the raised ridge of inlet 138, the gas to be purged enters space 240 located below diaphragm 228 and exits valve 200 through outlet 202 in direction 142. It is noted that diaphragm 228 is sealed around its periphery 242 as shown in FIGS. 18D-F to ensure that the gas to be purged has one ingress at 138 and one egress at 142.

As discussed above, in the ON position wire 124 is connected to the fuel cell and is heated by the fuel cell as hydrogen gas fills the anode side indicating a completion of the purge, and wire 124 contracts to its memorized shorter length. As best shown in FIGS. 18C and 18F, the shortened SMA wire 124 pulls free end 206 upward disengaging shoulder 210 from second ramps 238 thereby releasing slider 212. Spring 220 and/or spring arms 224 and/or 226 push slider 212 away from end 204 to return to the OFF position shown in FIGS. 18A and 18D. This upward movement also disengages SMA wire 124 from the fuel cell, and as SMA wire 124 cools and/or relaxes, as described above, pre-stressed cantilever beam 208 returns to its OFF position and stretches SMA wire 124. Extension 230 of cantilever beam 208 again presses diaphragm 228 toward the raised ridge on inlet 138 to close valve 200.

One advantage of valve 200 is that SMA wire 124 is isolated from the flow of the gas to be purged by diaphragm 228. This separation shields SMA wire 124, which is made from a metal alloy discussed above, from the flow of the gas to be purged. In purge valves 109 and 109' the gas to be purged flow through notch 122 of purge shuttle 110 and SMA wire 124 is exposed to this gas and heat can transfer from wire 124 to the gas to be purged. This heat transfer may affect the rate of change of SMA wire 124 depending on the size and the compositional make-up of the alloy. This may cool SMA wire prematurely. In purge valve 200, SMA wire 124 is isolated from the gas to be purged by diaphragm 228 thereby minimizing or obviating this issue.

Another advantage of purge valve 200 is that it can be opened intermittently to purge the fuel cell during operation. As discussed above, in the OFF position (FIGS. 18A and 18D) SMA wire is stretched by the pre-stressed cantilever beam 208. If the fuel cell system sends a current to SMA wire 124 while it is in the OFF position it would shrink and pulls free end 206 of cantilever beam 208 upward similar to that in the released position illustrated in FIGS. 18C and 18F. This lifts extension 230 of free end 206 and diaphragm 228 from the raised ridge on inlet 138 to open the purge valve. To close the purge valve, the electrical current stops and SMA wire 124 cools and is stretched by pre-stressed cantilever as it returns to the OFF position.

Hence, in the user activated mode at system start-up one sequence of operation for purge valve 200 is as follows: (i) OFF position to ON position caused by a user pressing a start button, (ii) ON position to RELEASE position caused by the current from the fuel cell as the purging process is completed heating the SMA wire and shortening it (iii) RELEASE position to OFF position caused by the cessation of current through the SMA wire controlled by the return of slider 212 to its OFF position and/or by a control system in the fuel cell system reading the position of the slider.

During the normal operation of the fuel cell system, intermittent purging has the following sequence: (i) OFF position (FIG. 18A) to RELEASE position (FIG. 18C, except that there is no movement by slider 212) caused by a temporary flow of current through the SMA wire to purge and (ii) said RELEASE position to OFF position caused by a cessation of current through the SMA wire by the control system in the fuel cell system.

Another purge valve 200' is illustrated in FIGS. 19A-D. Valve 200' is similar to valve 200, except that cantilever beam 208 is pre-stressed to bias upward or away from the inlet 138 (or outlet 202) and slider 212 moves in one direction to press free end 206 downward or toward inlet 138 to close valve 200'. Slider 212 moves in the opposite direction to allow free end 206 of cantilever beam 208 to move upward or away from inlet 138 to open valve 200'. Slider 212 is still spring biased by spring 220 to the OFF or closed position and a latch mechanism hold the slider 212 in the ON or open position until SMA wire 124 is heated and shrunk to release the latch mechanism.

Figure 19A:
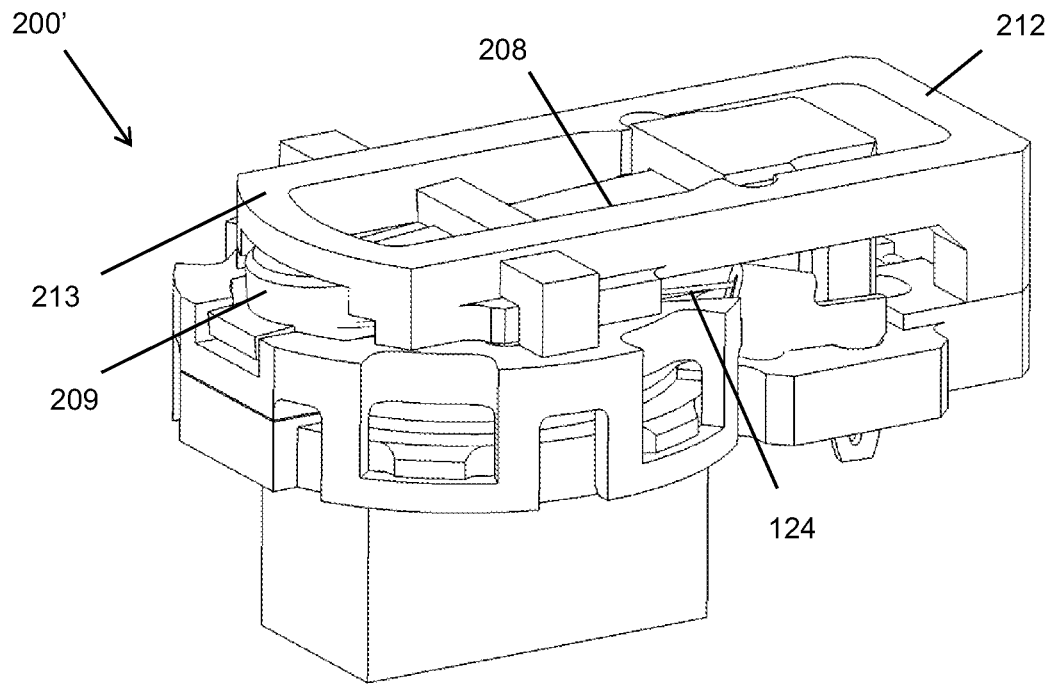
FIGS. 19A-B are perspective views of yet another purge valve in the off and on configurations.
Figure 19B:
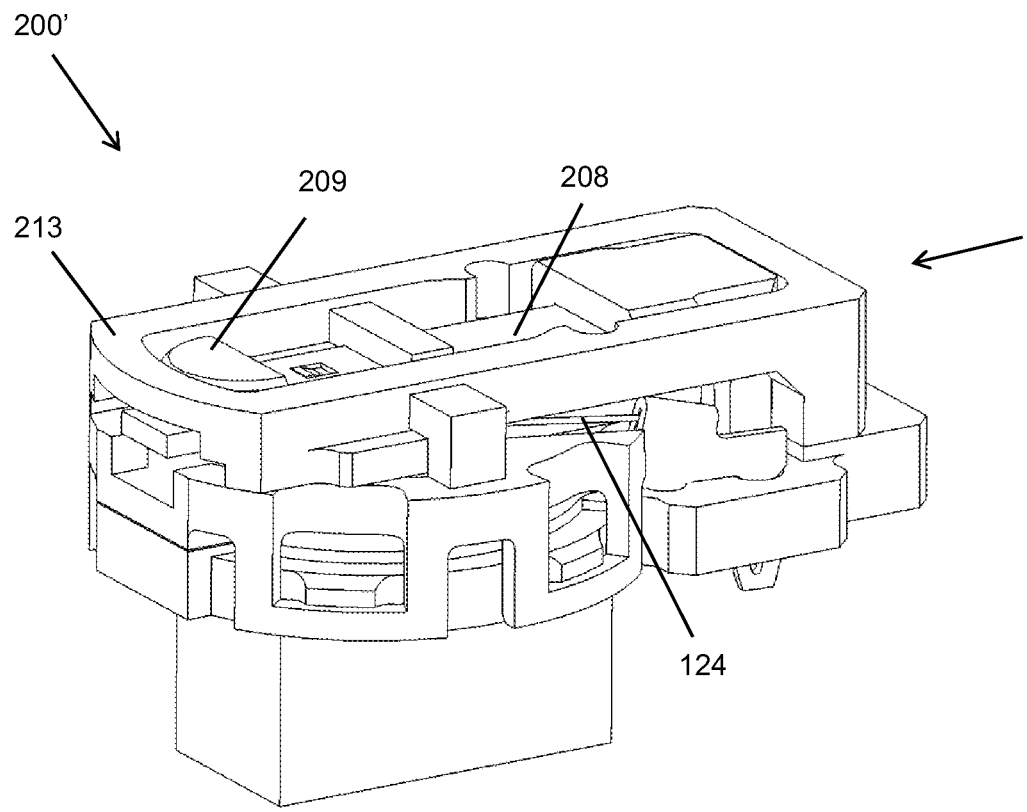
Figure 19C:
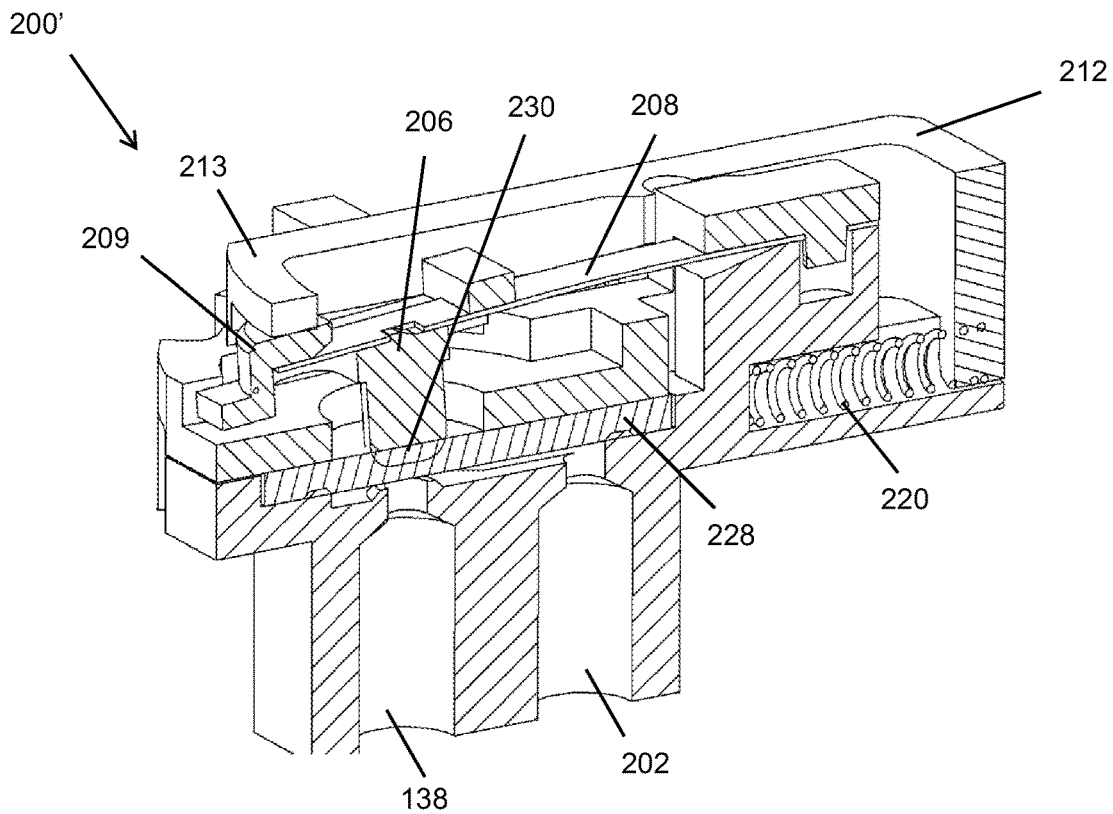
FIGS. 19C-D are cross-sectional views along the longitudinal axis of the purge valve shown in FIGS. 19A-B, respectively.
Figure 19D:
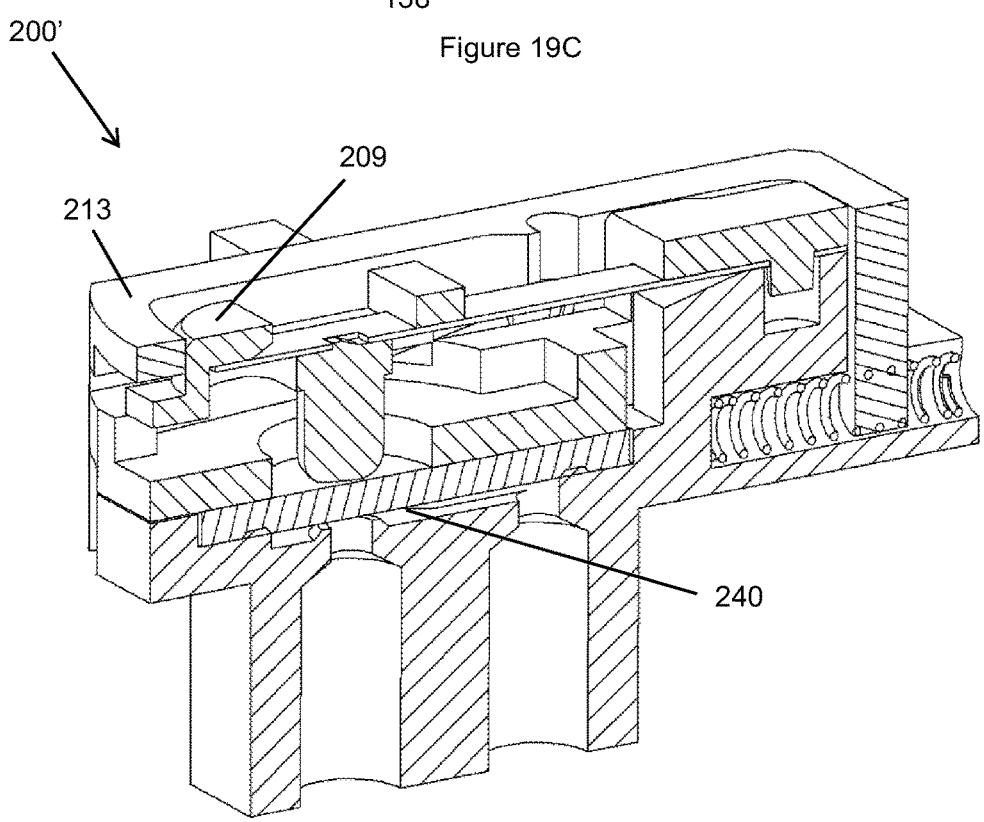

Referring to FIGS. 19A and 19C, which show purge valve 200' in the OFF position, end 213 of slider 212 is holding terminal end 209 of cantilever beam 208 downward toward inlet 138 against the biasing tendency of cantilever beam 208 to move upward. Extension 230 of free end 206 presses diaphragm 228 to seal the raised edge of inlet 138 to close valve 200'. FIGS. 19B and 19D show purge valve 200' in the ON position. Slider 212 moves in the direction shown, e.g., when an ON/OFF push button is pushed, and terminal end 209 of cantilever beam 208 moves upward due to the biasing tendency of the cantilever beam until terminal end 209 catches end 213 of slider 212 as shown. This forms a latching mechanism holding slider 212 to cantilever beam 208. In this configuration, extension 230 also moves upward away from inlet 138 to open valve 200' to the ON position. SMA wire 124 is also anchored to the housing of the valve and is wrapped around terminal end 209 of cantilever beam 208. When heated by the fuel cell, SMA wire 124 shrinks and pulls terminal end 209 away from end 213 of slider 212 to release the latch. Slider 212 biased by spring 220 or the spring arms 224 or 226 (not shown in FIGS. 19A-D) moves back to the OFF position.

It is further noted cantilever beam 208 and its extension member 230 can also close valve 200 and 200' by closing outlet 202 instead of closing inlet 138 discussed above.

It is noted that purge valve 200 can perform any function that purge valves 109 and 109' can perform. For example, valve 200 can be in the ON position when the fuel cell system 21 is turned ON or is turned OFF. A second valve 200 can also be included in integrated fluidic interface module to automatically turn off fuel cell system 21 if no electrical current is drawn from the system, e.g., when system 21 is idle. Second valve 200 would be in fluidic connection with terminal end 30' of inner tube 30 of port 18. The inlet of second valve 200 would be connected to terminal end 30' and the outlet of second valve 200 would be the new terminal end 30' that is in fluid communication with pressure regulator 60, as best illustrated by FIG. 1C. FIG. 18F is also labeled with terminal end 30'. Second valve 200 can also be located elsewhere in the fluidic circuit. For example, the inlet could be connected to the downstream side of pressure regulator 60 and the outlet could be outlet 92 that connects to the fuel cell.

The second valve 200 can be turned to the ON position by the same motion or the same push button that turns the first purge valve 200 to the ON position, so that the user only has to perform one operation. After the purging step the fuel cell heats the first purge valve 200 to close it, but the second valve 200 remains open. A circuit or chip on board 135 is provided to ascertain whether fuel cell system 21 is idle or if no device is drawing or withdrawing current from fuel cell system 21, then this circuit can send current to SMA wire 124 of the second valve to move it to the OFF position to cut off fuel and shut down fuel cell system 21. This is done automatically without user's input.

Accordingly, another aspect of the present invention includes a method of operating a fuel cell system comprising at least one fuel cell and an automatic shut-off valve (200). This method comprising the steps of opening the automatic shut-off valve (200);

flowing fuel to the fuel cell system to produce an electrical current;

monitoring the electrical current produced by the fuel cell and transmitted to a consumer device, and when said electrical current is reduced to a predetermined threshold, connecting the at least one fuel cell to a conductive element in the automatic shut-off valve to close said shut-off valve.

The conductive element can be a shape memory alloy (SMA) and in step (d) the fuel cell heats up the conductive element which retracts and moves the shut-off valve to a closed position.

The ON button that the user activates when purge valve(s) 200 is used would be simpler because only slider(s) 212 has to be moved in one direction. Additionally, the initial activation of the ON button can be eliminated if the act of inserting cartridge 20 into system 21 also moves slider(s) 212 to the ON position. When the second valve 200 is used, fuel cell system 21 can automatically turns itself off for non-use, the user only has to activate the ON button for subsequent uses.

Figure 14:
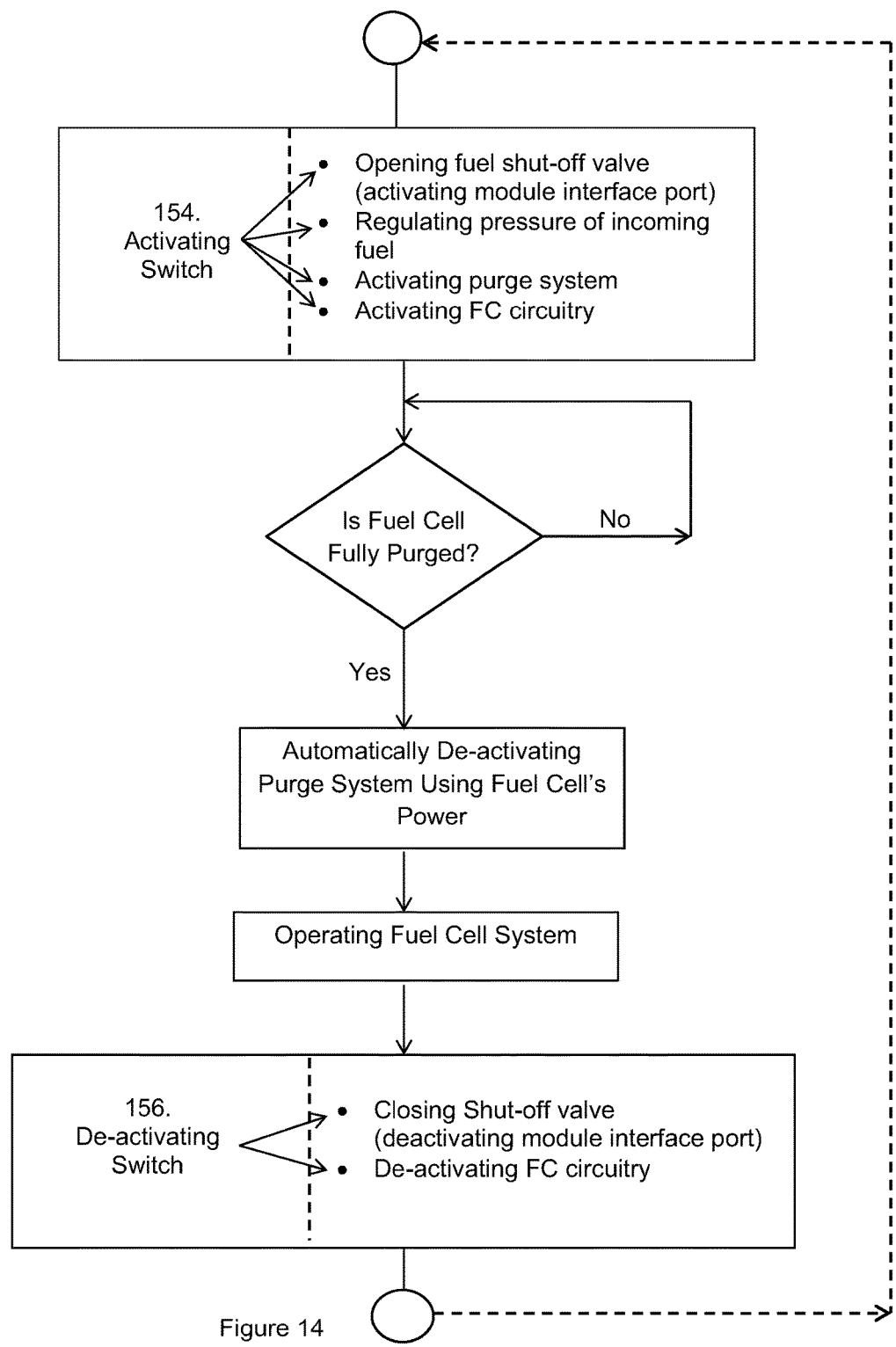
FIGS. 14 and 15 are flow charts illustrating inventive methods of operating fuel cell systems.

The present invention further includes methods for operating the fuel cell system using the purge valves 109 and 109' described above or other purge valves. First, method 152 is shown in FIG. 14. Demonstrating the integrated aspect of the present invention, a user activates the system once at step 154, e.g., activating switch 12. The system performs at least four functions or steps as the result of this activation including (i) activating module interface port 18 which opens the fuel shut-off valve 26, (ii) regulating the pressure of the incoming fuel using fuel regulator 60, (iii) activating purge valve system 109 and electrically connecting the fuel cell to the purge valve system to vent the anode plenum of the fuel cells and (iv) connecting the fuel cell to the external load after the purge valve system is deactivated. Nothing else is required from the user until system is shut-down. Thereafter, the system uses its own power from the fuel cell and automatically closes the purge valve when purging is completed, e.g., using a SMA material, without active control by a microprocessor, sensors or a user. The system then operates normally to produce electricity to run a load. When the user wishes to shut the system down, s/he de-actives switch 12, which closes shut-off valve 26 by retracting module interface port 18 and de-activates the fuel cell circuitry.

Figure 15:
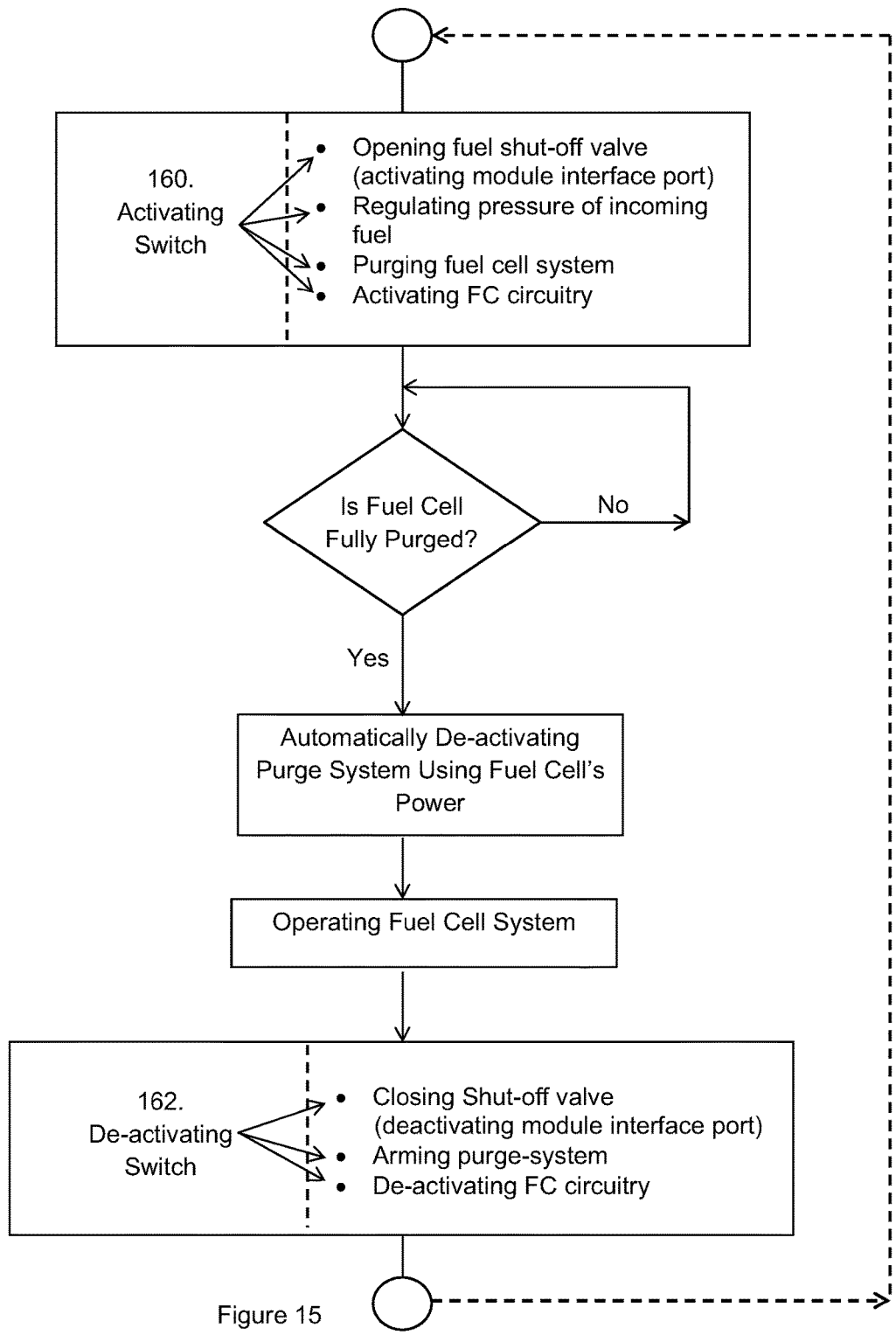

FIG. 15 illustrates another method for operating a fuel cell. Inverse method 158 is similar to method 152, except that in the activating step 160 the system purges the fuel cell system or vents the anode plenum of the fuel cell and in the de-activating step 162 the purged system is armed, i.e., inverse purge valve is opened when the system shuts down, as discussed above.

Demonstrating the passive aspect of the present invention, integrated fluidic interface module 10, method 152 and inverse method 158 do not require controller or microprocessor to operate, and no user interaction is necessary other than activating the ON/OFF switch. No external power source, such as batteries, is required to start the system. Alternatively, methods 152 and 158 can be operated with active control by a processor controlling an electrical valve, e.g., solenoid valve.

Another method of operating the fuel cell system is also described above using the second valve 200 with SMA wire 124 to automatically turn the fuel cell system off, when it is idle or when no current is drawn from the fuel cell.

Figure 16:
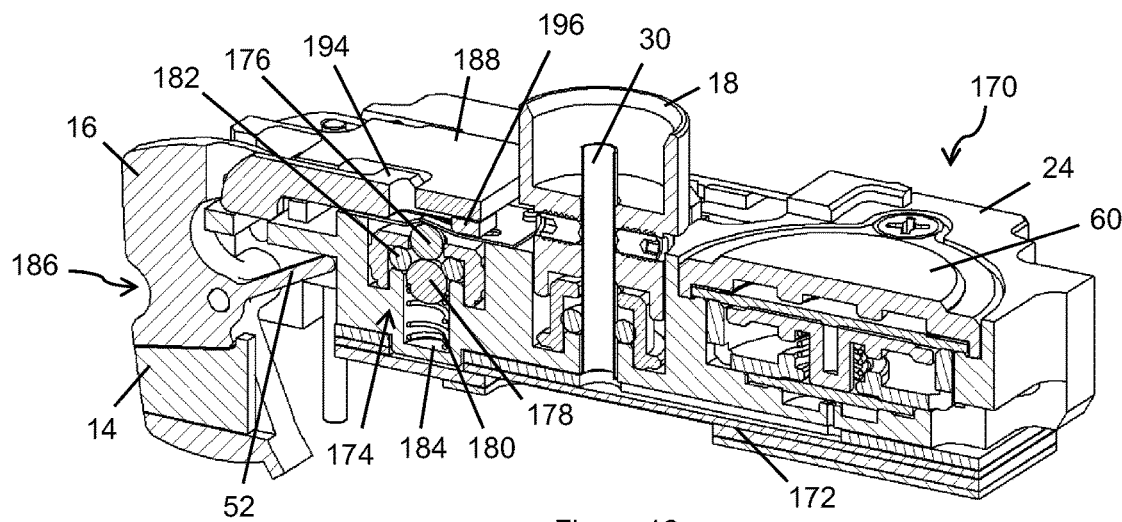
FIG. 16 is a cross-sectional view of another integrated fluidic interface module.
Figure 17A:
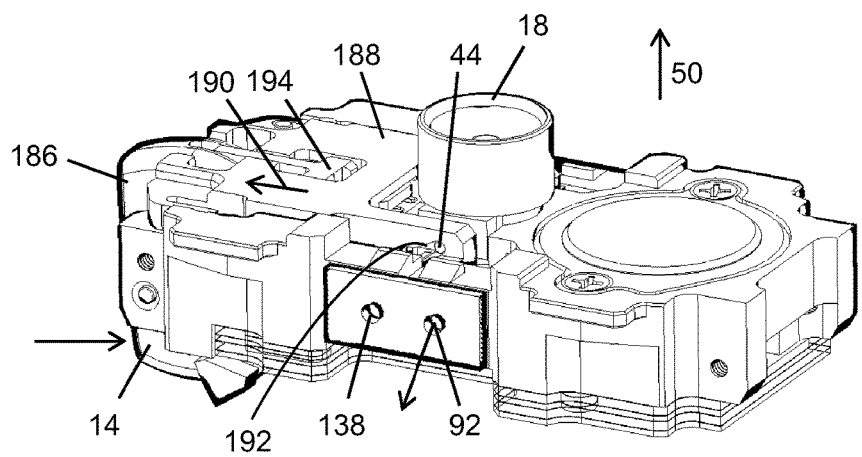
FIGS. 17A and 17B are perspective view of the integrated fluidic interface module showing the actuation of same.
Figure 17B:
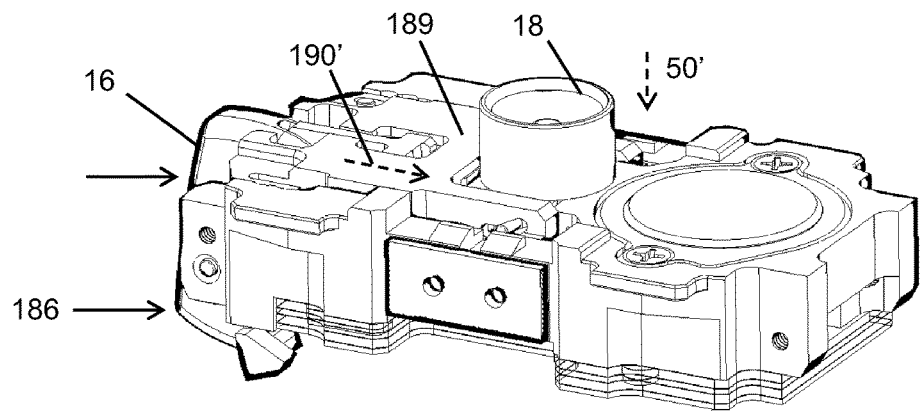

Another integrated fluidic interface module is illustrated in FIGS. 16-17B. Similar to module 10, module 170 has movable module interface port 18 and tube 30 to open valve 26 on cartridge 20. Module 170 also has pressure regulator 60 and a flow manifold 172 fluidly connecting tube 30 to pressure regulator 60 and out of module outlet 92 to fuel cells 108.

Module 170 has a manual purge valve 174, which comprises a ball valve and ball actuator 176. The ball valve comprises sealing ball 178 biased by spring 180 into sealing element 182. Actuator ball 176 sits immediately adjacent to sealing ball 178, and actuator ball 176 is pushed towards sealing ball 178 against the force of spring 180 to open purge valve 174. Residual gases from the fuel cells enter module 170 at purge port 138 and out of module 170 to vent at exit hole 184.

Switch 186 on module 170 is similar to switch 12, and is also used to extend and to retract module interface port 18. Switch 186 is pivotally attached to the body of module 170. When a user pushes ON segment 14 of switch 186, this action moves actuator plate 188 in direction 190 and compresses spring arm 52. This movement forces side knobs 44 on module interface port 18 to ride up ramp or cam surface 192, thereby extending or moving module interface port 18 in direction 50, as shown in FIG. 17A. In this configuration, module interface port 18 advances towards cartridge 20 to open shut-off valve 26. When released, switch 186 returns to its rest position due to spring arm 52 releasing its stored energy, actuator plate 188 remains in the configuration shown in FIG. 17A to keep module interface port 18 engages with cartridge 20.

When the user pushes OFF segment 16 of switch 186, this action moves actuator plate 188 in direction 190'. This movement forces sides knobs 44 on module interface port 18 to ride down ramp or cam surface 192, thereby retracting or moving module interface port 18 in direction 50', as shown in FIG. 17B. In this configuration, module interface port 18 withdraws from cartridge 20 allowing cartridge shut-off valve 26 to close.

Similar to module 10, switch 186 of module 170 also actuates manual purge valve 174. Referring to FIG. 16, switch 186 is connected to purge actuator 194. When the user pushes ON segment of switch 186, purge actuator 194 also moves in direction 190 such that edge 196 of purge actuator 194 moves over actuator ball 176 to open purge valve 174. Due to the spacing between edge 196 and the rest of purge actuator 194, when switch 186 returns to the rest position edge 196 moves away from actuator ball 176 and purge valve 174 closes. The duration of the period that purge valve 174 opens depends on the duration that switch 186 is held in the ON position. Unlike actuator plate 188, purge actuator 194 is fixedly connected to switch 186 so that these two components move together.

As described above, switch 186 actuates both the module interface port 18 to open shut-off valve 26 and purge valve 174, as well as activating the fuel cell circuitry.

Any known fuel cell that consumes hydrogen can be used in fuel cell system 10. Preferably planar or side-by-side fuel cells are used. Suitable fuel cells are disclosed in U.S. Pat. Nos. 5,989,741, 6,127,058, 7,632,587, 7,378,176 and 7,474,075, published U.S. patent application nos. 2002/0182475, 2004/0224190, 2006/0127734, 2007/0184330, 2007/0196701, 2008/0233454, 2009/0081493, US 2009123803, US 2009169945, 2009/0311561, 2009/0162722, 2009/0130527, 201110003299, US 201110165495 and US 2013059225 and published international patent application nos. WO 2007020242, WO 2009/105896, WO 2011/079378, and WO 20111079377, among others. These references are incorporated herein by reference in their entireties.

Any known hydrogen storing or generating cartridges or system can be used. Such systems are disclosed in U.S. Pat. Nos. 7,674,540, 8,002,853, 7,481,858, 7,727,293 and 7,896,934, and published U.S. patent application nos. 2010/0104481, 2011/0189574, 201110243836 and 2009/0123342, among others. These references are incorporated herein by reference in their entireties. Fuel cartridges that contain liquid fuel cell fuels, such as butane or methanol, disclosed in U.S. Pat. Nos. 7,172,825 and 7,059,582 can also be used with the various embodiments of the present invention.

Suitable pressure regulators are disclosed in U.S. Pat. No. 8,002,853, published international patent application no. WO 20111127608 and published U.S. patent application nos. 2008/0233446, 2010/0104481 and 2011/0212374. These references are incorporated herein by reference in their entireties.

The fuel cell system 21 may also have a relief valve or a vent valve to release hydrogen fuel or other fuel when the internal pressure exceeds a certain level.

The preceding detailed description refers to the accompanying drawings that depict various details of examples embodiments. The discussion addresses various examples of the inventive subject matter at least partially in reference to these drawings, and describes the depicted embodiments in sufficient detail to enable those skilled in the art to practice the embodiments. Many other embodiments may be utilized other than the illustrative examples discussed herein, and many structural and operational changes in addition to the alternatives specifically discussed herein may be made without departing from the scope of the inventive subject matter.

Throughout the preceding description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

The following parts list correlates the reference numbers used in the drawings to the part names used in the specification.

| Reference # | Parts Names |
|---|---|
| 10 | Integrated fluidic interface module |
| 12 | Switch |
| 14 | ON segment |
| 16 | OFF segment |
| 18 | Module interface port |
| 20 | Fuel cartridge |
| 21 | Fuel cell system |
| 22 | Top side |
| 23 | Clamp on fuel cell system 21 |
| 24 | Bottom side |
| 26 | Cartridge shut-off valve |
| 28 | Outer guard of cartridge port 18 |
| 30 | Inner tube of cartridge port 18 |
| 32 | Central post of valve 26 |
| 34 | Gap on valve 26 to receive tube 30 |
| 36 | Valve body of valve 26 |
| 38 | Seal retainer on valve 26 |
| 40 | Seal(s) in valve 26 |
| 42 | Channel on cartridge 20 matching guard 28 |
| 44 | Knob on module interface port 18 |
| 45 | Detent on port 1 8 |
| 46 | Yoke(s) on switch 12 |
| 47 | Leg of detent 45 |
| 48 | U-shaped end of yoke 46 |
| 50, 50' | Directions of movement of port 18 |
| 52 | Spring arm on switch 12 |
| 54 | Pivot boss on switch 12 |
| 56, 56' | Directions of movement of switch 12 |
| 58, 58' | Directions of movement of yoke 12 |
| 60 | Pressure regulator |
| 62 | Inlet diaphragm |
| 64 | Shuttle |
| 66 | Outlet diaphragm |
| 68 | Large end of shuttle 64 |
| 70 | Small end of shuttle 64 |
| 72 | Shuttle housing |
| 73 | Shuttle housing vent |
| 74 | Spring inside pressure regulator 60 |
| 76 | Outlet chamber |
| 78 | Inlet chamber |
| 80 | Inlet channel |
| 82 | Direction of inlet fuel flow |
| 84 | Inlet of pressure regulator 60 |
| 86 | Outlet of pressure regulator 60 |
| 88 | Outlet channel |
| 90 | Direction of outlet fuel flow |
| 92 | Module outlet |
| 94 | Feedback port |
| 96 | First feedback channel |
| 98 | Direction of feedback flow |
| 100 | Second feedback channel |
| 102 | Direction of feedback flow |
| 104 | Outlet chamber port |
| 106 | Thin covering films |
| 107 | Anode(s) |
| 108 | Fuel cell(s) |
| 109 | Semi-automatic purge valve |
| 109' | Semi-automatic inverse purge valve |
| 110 | Purge shuttle |
| 110' | Inverse purge shuttle |
| 112 | Sealing member for purge valve |
| 113 | Direction of sealing for purge valve |
| 114 | Sealing portion of purge shuttle 110 |
| 115 | Direction of movement for purge shuttle |
| 116 | Open portion of purge shuttle 110 |
| 118 | Shoulder of purge shuttle 110 |
| 120 | Extension on purge shuttle 110 |
| 122 | Notch on purge shuttle 110 |
| 124 | Shape memory alloy (SMA) wire |
| 126 | Posts supporting wire 124 |
| 127 | Channel on module 10 to store wire 124 |
| 128 | Slit under shoulder 118 |
| 130 | Channel on purge shuttle 110 for wire 124 |
| 132 | Purge valve pusher |
| 134 | Fingers on pusher 132 |
| 135 | PC board |
| 136 | Direction of purging gases |
| 137 | Output/USB port |
| 138 | Purge port on module 10 |
| 140 | Purge channel(s) |
| 142 | Direction of purged gases |
| 144 | Double-ended purge shuttle |
| 146 | Module interface port with pusher 132 |
| 148, 150 | Opposite surfaces on shoulder 118 |
| 152-156 | Methods of operating the fuel cell system |
| 170 | Integrated fluidic interface module |
| 172 | Manifold in module 170 |
| 174 | Manual purge valve |
| 176 | Actuating ball |
| 178 | Sealing ball |
| 180 | Spring |
| 182 | Sealing member |
| 184 | Purge exit hole |
| 186 | Switch |
| 188 | Actuating plate |
| 190, 190' | Directions of movement of actuating plate 188 |
| 192 | Ramp or cam surface |
| 194 | Purge actuator |
| 196 | Edge of purge actuator 1 94 |
| 200 | Purge valve and automatic shut-off valve |
| 200' | Purge valve |
| 202 | Outlet |
| 204 | End |
| 206 | Free end |
| 208 | Cantilever beam |
| 209 | Terminal end |
| 210 | Shoulder |
| 212 | Movable biased slider |
| 213 | End of slider |
| 214 | Main body |
| 216 | Forked legs |
| 218 | Hooked ends |
| 220 | Helical spring |
| 222 | Ledge |
| 224 | Spring arms |
| 226 | Spring arms |
| 228 | Flexible diaphragm |
| 230 | Extension |
| 232 | Notches |
| 234 | Direction |
| 236 | First ramp |
| 238 | Second ramp |
| 240 | Space |
| 242 | Periphery |

According to yet another aspect of the present invention, flow restrictors such as reduced diameter section(s) in the flow path or bends in the flow path can be inserted into the fluidic circuit. In one example, the flow restrictor can be positioned proximate to purge port 138 to reduce or control the flow rate of the gas to be purged before it reaches purge valve 109, 109' or 200. In other example, the flow restrictor can be position upstream of the fuel cell or upstream of outlet 92 of module 10 and the flow restrictor can be upstream or downstream of pressure regulator 60.

Additionally, although two outlets 92 to the fuel cell(s) are shown, the present invention is not limited to any number of fuel cells, which can be one fuel cell or more than two fuel cells.

It is intended that the present specification and examples be considered as exemplary only with a true scope and spirit of the invention being indicated by the following claims and equivalents thereof. Other embodiments of the present invention will be apparent to those skilled in the art from consideration of the present specification and practice of the present invention disclosed herein. Additionally, components or features of one embodiment can be utilized in other embodiments.

The invention claimed is:

1. A valve comprising:
   an inlet, an outlet, a diaphragm,
   a biasing member that urges the diaphragm toward the inlet or outlet to a sealing position to close the valve,
   a slider that moves the biasing member to an open position to allow the diaphragm to move away from the inlet or outlet to open the valve, and,
   a shape memory alloy (SMA) actuator connected to the biasing member and is actuated by an electrical current to move the biasing member to the open position;
   wherein the slider comprises a main body and two forked legs extending from the main body, the two forked legs each having a hooked end having a first ramp on a distal end of the forked leg, wherein the two forked legs form a spring and store energy when the two forked legs are pressed toward each other in a first direction, wherein each of the two forked legs has a second ramp extending in a second direction orthogonal to the first direction;
   wherein the valve further comprises a valve body having a plurality of notches defined thereon, each of the plurality of notches sized and dimensioned to receive one of the hooked ends in a retained engagement created by the spring force of the associated forked leg expanding away from the other of the two forked legs;
   wherein the biasing member comprises a shoulder configured to catch a second ramp of one of the two forked legs of the slider to hold the slider in a position that keeps the biasing member in the open position.

2. The valve of claim 1, wherein the electrical current is produced by a fuel cell during start-up or during operation.

3. The valve of claim 2, wherein the SMA actuator is isolated from the fuel cell's current to allow the biasing member to return to the sealing position.

4. The valve of claim 1, wherein when actuated the SMA actuator moves the shoulder of the biasing member to release the second ramp and to release the slider.

5. The valve of claim 1, wherein the slider is biased by at least one spring.

6. The valve of claim 1, wherein the biasing member is a cantilever beam.

7. The valve of claim 1, wherein the diaphragm is located to isolate the SMA actuator from a fluid that passes through the valve.

8. The valve of claim 1, wherein:
   the valve body further comprises two valve-body spring arms;
   the slider further comprises two slider-body spring arms;
   the two valve-body spring arms and two slider-body spring arms are configured to engage such that the two valve-body spring arms, the two slider-body spring arms, or both flex and store potential energy when the slider moves the biasing member to an open position.

* * * * *